US012097530B2

(12) United States Patent
Loginov et al.

(10) Patent No.: US 12,097,530 B2
(45) Date of Patent: Sep. 24, 2024

(54) DEVICE FOR PRODUCING OPTICAL EFFECT LAYERS

(71) Applicant: SICPA HOLDING SA, Prilly (CH)

(72) Inventors: Evgeny Loginov, Renens (CH); Mathieu Schmid, Lausanne (CH); Edgar Mueller, Lausanne (CH); Claude-Alain Despland, Prilly (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 18/110,080

(22) Filed: Feb. 15, 2023

(65) Prior Publication Data

US 2023/0191452 A1 Jun. 22, 2023

Related U.S. Application Data

(62) Division of application No. 17/422,166, filed as application No. PCT/EP2019/087072 on Dec. 27, 2019, now Pat. No. 11,618,053.

(30) Foreign Application Priority Data

Jan. 15, 2019 (EP) .................................... 19151899

(51) Int. Cl.
*B05D 5/06* (2006.01)
*B05D 3/00* (2006.01)
*B05D 3/06* (2006.01)

(52) U.S. Cl.
CPC ............ *B05D 5/065* (2013.01); *B05D 3/067* (2013.01); *B05D 3/207* (2013.01)

(58) Field of Classification Search
CPC ........ B05D 3/207; B05D 5/06; B42D 25/369; B41M 3/14; H01F 41/16; B05C 1/00
See application file for complete search history.

(56) References Cited

U.S. PATENT DOCUMENTS 4,838,648 A 6/1989 Phillips et al.
6,137,518 A 10/2000 Maeda
(Continued)

FOREIGN PATENT DOCUMENTS

CN 102529326 8/2014
EP 0686675 2/1998
(Continued)

OTHER PUBLICATIONS

Zhu. Z. Q. et al. "Halbach permanent magnet machines and applications: a review", IEE. Proceedings—Electric Power Applications, vol. 148, Issue No. 4, Jul. 2001, pp. 299-308.
(Continued)

*Primary Examiner* — Tabassom Tadayyon Eslami
(74) *Attorney, Agent, or Firm* — Muncy, Geissler, Olds & Lowe, P.C.

(57) ABSTRACT

The present invention relates to the field of protecting value documents and value commercial goods against counterfeit and illegal reproduction. In particular, the present invention provides processes for producing optical effect layers (OELs) comprising non-spherical magnetic or magnetizable particles and comprising a motif made of at least two areas made of a single applied and cured layer, said motif being obtained by using a selective curing performed by irradiation with an actinic radiation LED source (x41) comprising an array of individually addressable actinic radiation emitters.

5 Claims, 20 Drawing Sheets

(56) References Cited

U.S. PATENT DOCUMENTS

| | | | |
|---|---|---|---|
| 6,410,130 | B1 | 6/2002 | Schuhmacher et al. |
| 6,531,221 | B1 | 3/2003 | Schuhmacher et al. |
| 6,582,781 | B1 | 6/2003 | Schuhmacher et al. |
| 6,838,166 | B2 | 1/2005 | Phillips et al. |
| 2002/0182383 | A1 | 12/2002 | Phillips et al. |
| 2003/0151821 | A1 | 8/2003 | Favalora et al. |
| 2007/0109382 | A1 | 5/2007 | Lafleche et al. |
| 2007/0172261 | A1 | 7/2007 | Raksha et al. |
| 2010/0021658 | A1 | 1/2010 | Raksha et al. |
| 2011/0221431 | A1 | 9/2011 | Kwon et al. |
| 2012/0162344 | A1 | 6/2012 | Raksha et al. |
| 2017/0253070 | A1 | 9/2017 | Loginov et al. |
| 2017/0305184 | A1* | 10/2017 | Muller .................. B05D 5/065 |
| 2019/0314857 | A1 | 10/2019 | Nikseresht Ghanepour et al. |

FOREIGN PATENT DOCUMENTS

| | | | |
|---|---|---|---|
| EP | 1407897 | | 4/2004 |
| EP | 1666546 | | 6/2006 |
| EP | 1710756 | | 10/2006 |
| EP | 2157141 | | 2/2010 |
| EP | 2402401 | | 1/2012 |
| EP | 2468423 | * | 6/2012 |
| EP | 2484455 | | 8/2012 |
| EP | 3178569 | | 6/2017 |
| EP | 3459758 | | 3/2019 |
| WO | 2002073250 | | 9/2002 |
| WO | 2002090002 | | 11/2002 |
| WO | 2003000801 | | 1/2003 |
| WO | 2006063926 | | 6/2006 |
| WO | 2007131833 | | 11/2007 |
| WO | 2010058026 | | 5/2010 |
| WO | 2015082344 | | 6/2015 |
| WO | 2015086257 | | 6/2015 |
| WO | 2016015973 | | 2/2016 |
| WO | 2016026896 | | 2/2016 |
| WO | 2016083259 | | 6/2016 |
| WO | 2016193252 | | 12/2016 |
| WO | 2017021504 | | 2/2017 |
| WO | 2017116678 | | 7/2017 |
| WO | 2017157619 | | 9/2017 |
| WO | 2017178651 | | 10/2017 |
| WO | 2018045230 | | 3/2018 |
| WO | 2018141547 | | 8/2018 |

OTHER PUBLICATIONS

Pereira Thiago et al. "Printing Anisotropic Appearance with Magnetic Flakes", ACM Transactions on Graphics, vol. 36, Issue No. 4, Article 123, Jul. 2017, pp. 123: 1-123:10.

Extended European Search Report issued with respect to application No. 19151899.2.

* cited by examiner

Fig. 2A
Fig. 2B
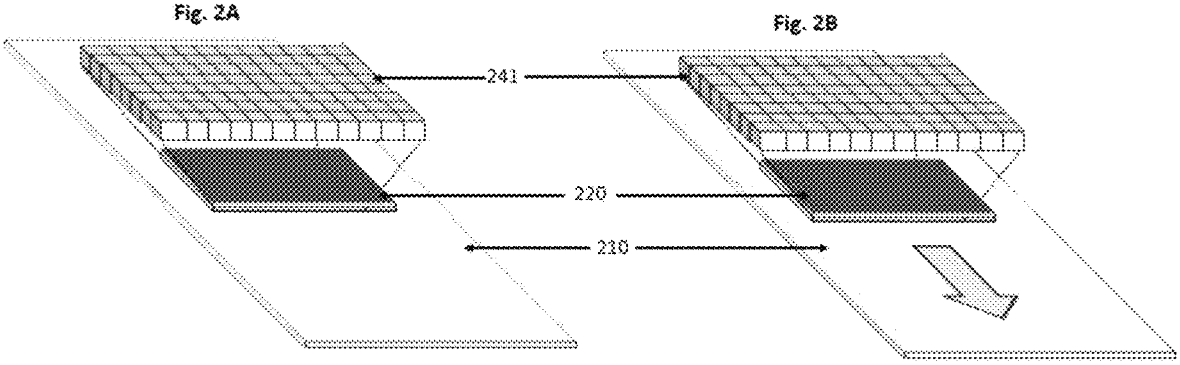
Fig. 2C
Fig. 2D
Fig. 2E
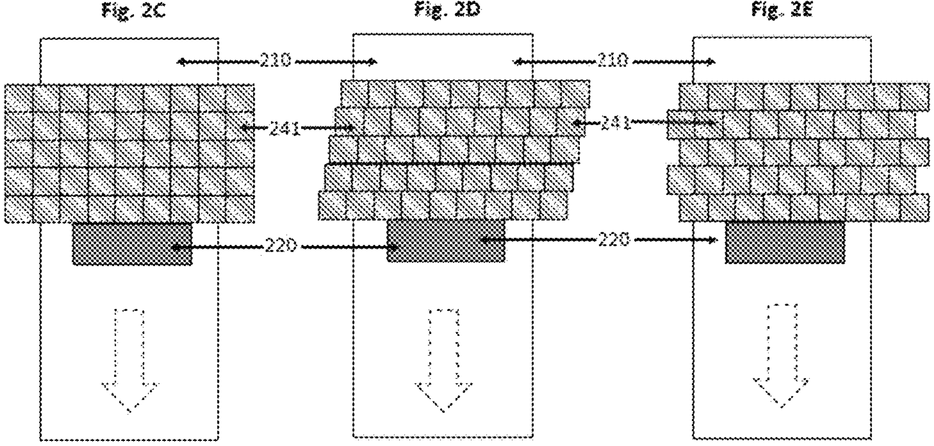

Fig. 4A1
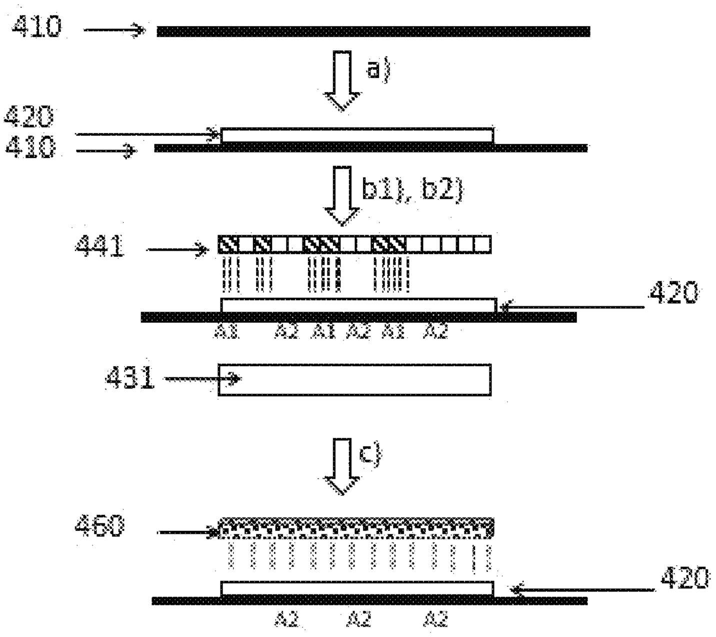
Fig. 4A2
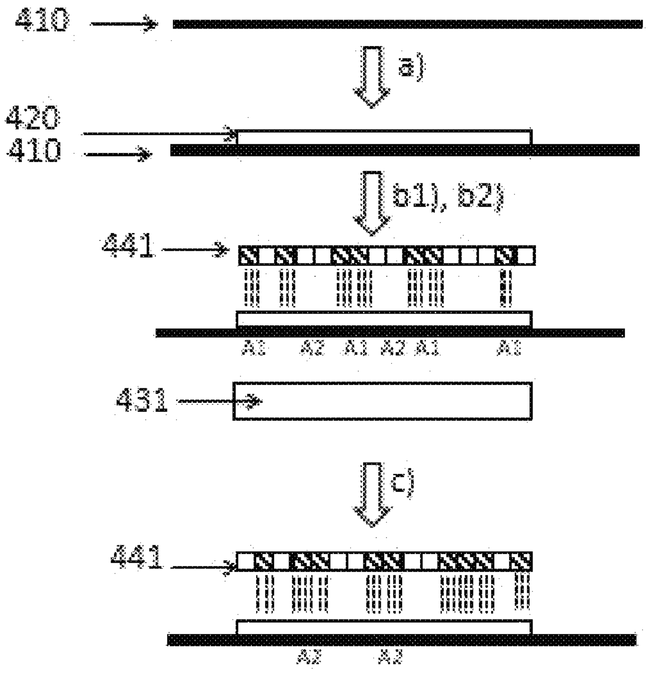

Fig. 5A1
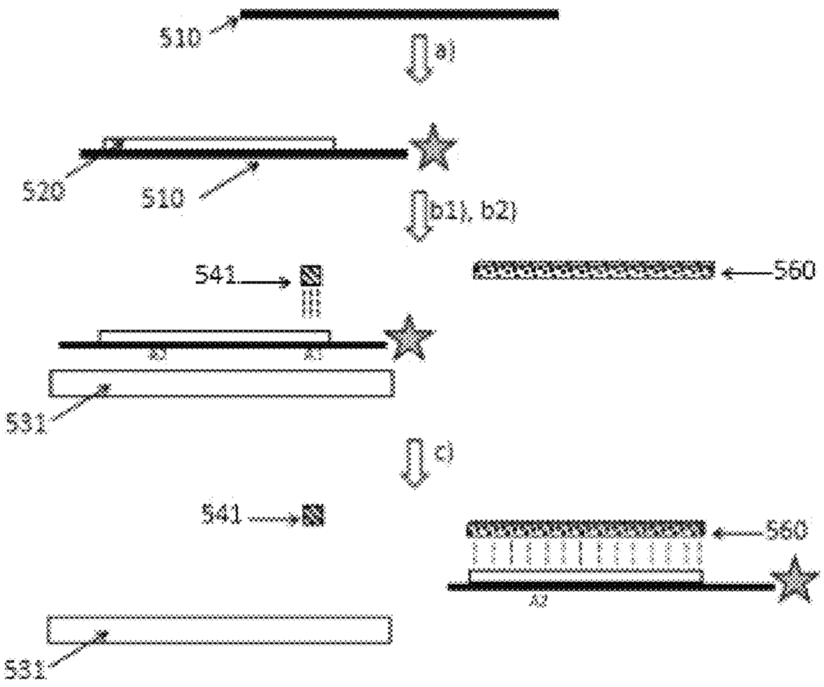
Fig. 5A2
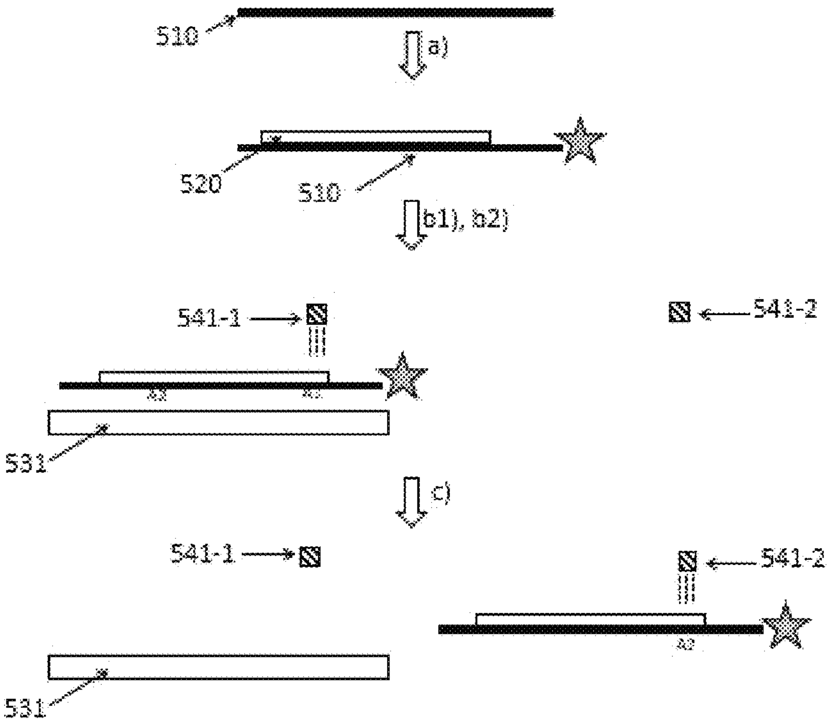

Fig. 6A1
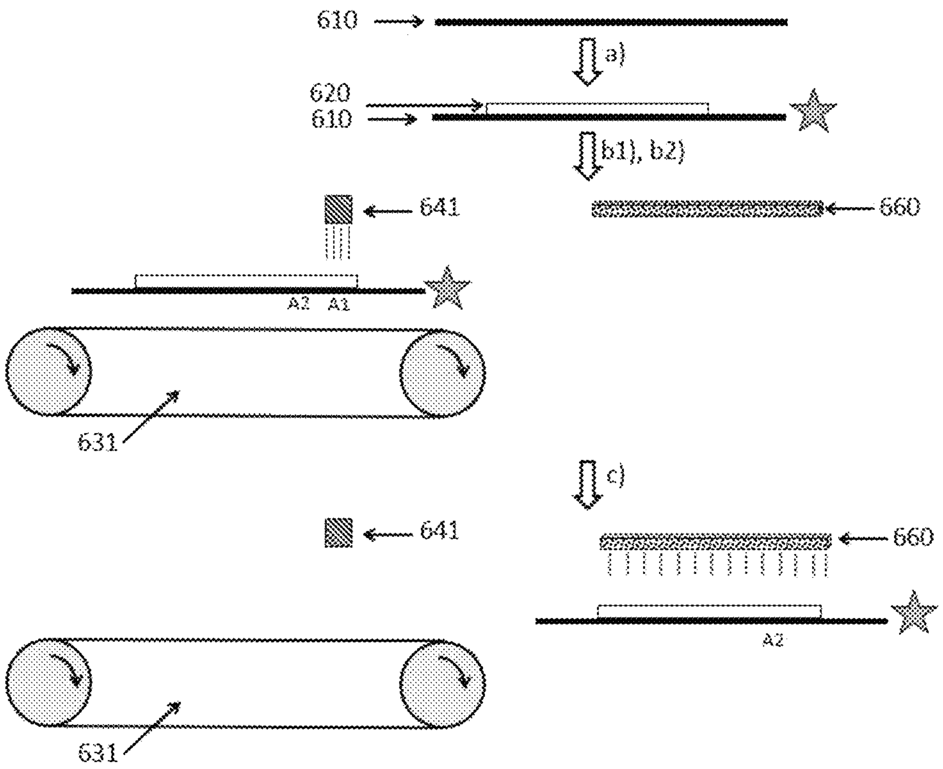
Fig. 6A2
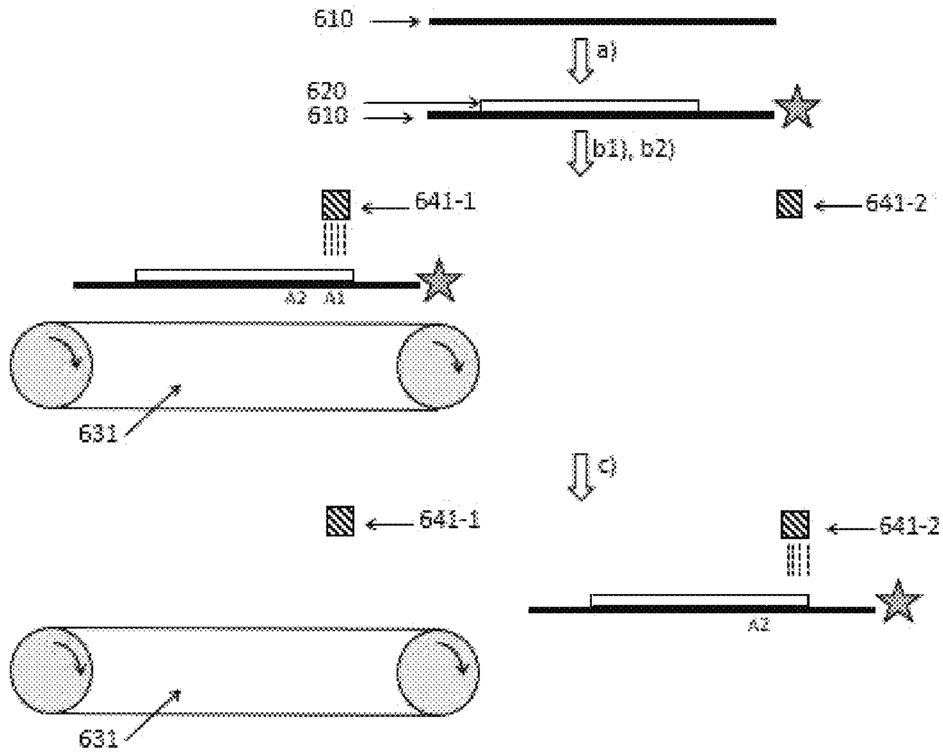

Fig. 7A1
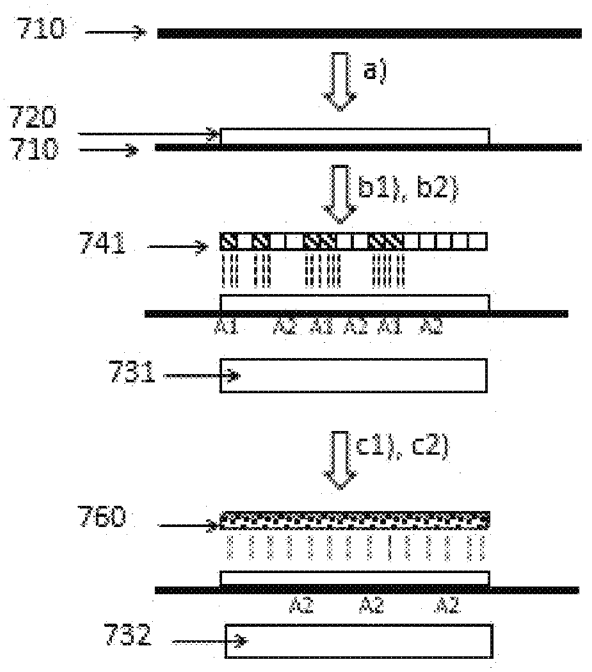
Fig. 7A2
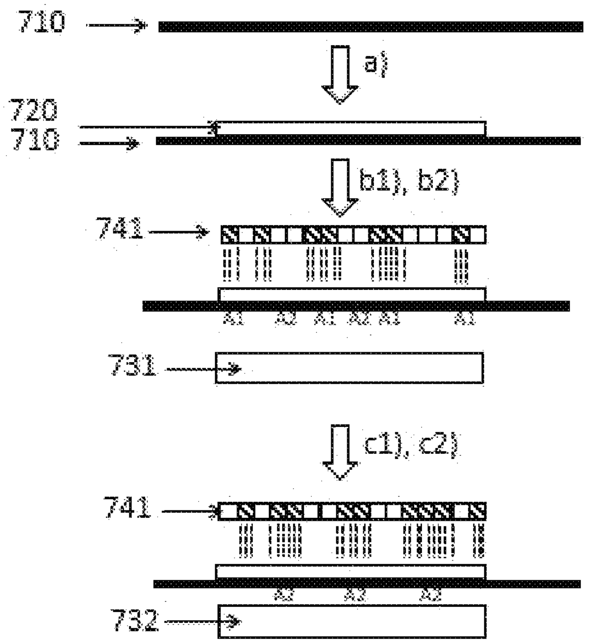

Fig. 7A3
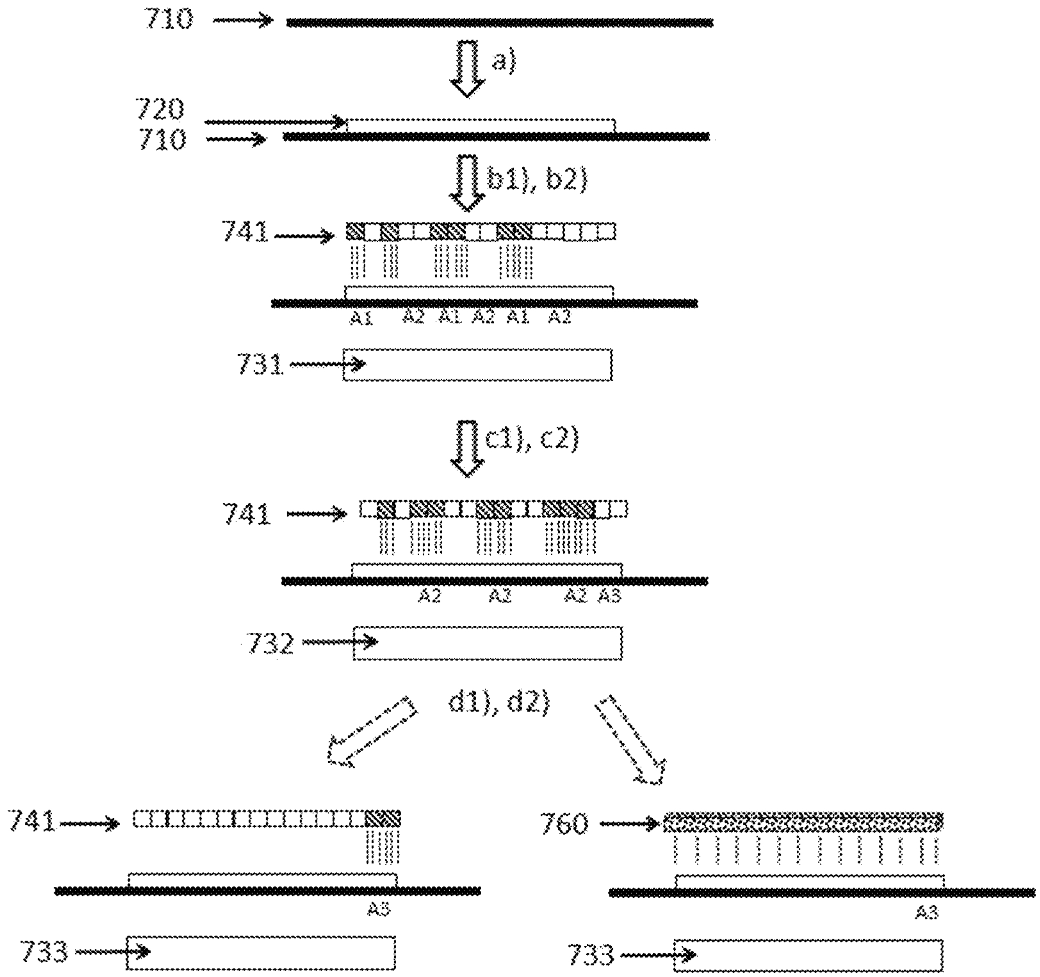

Fig. 8A1
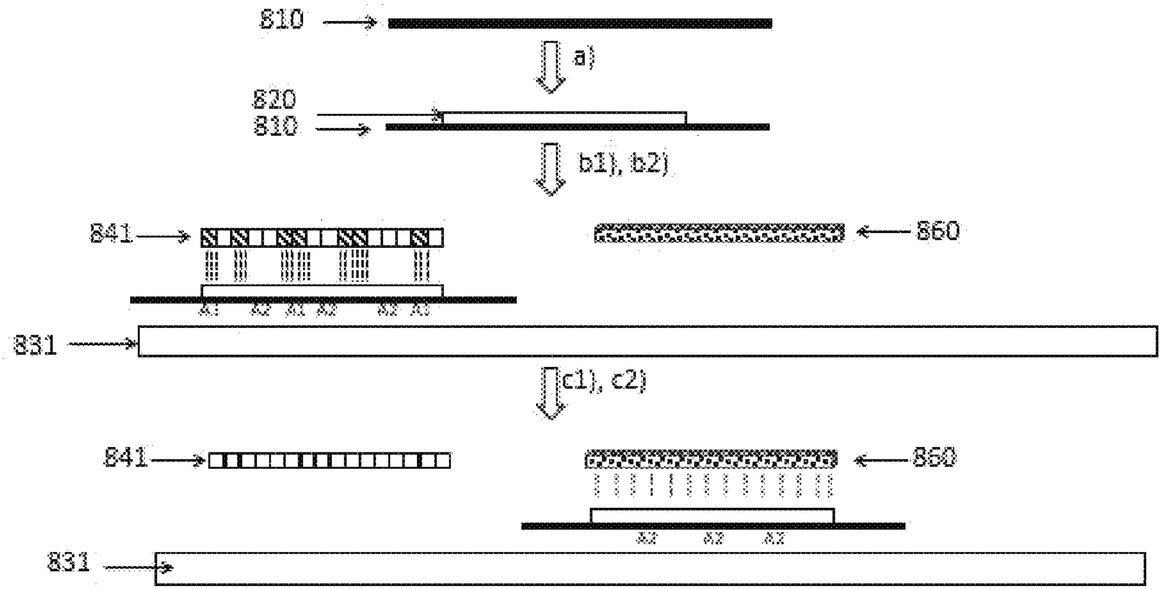
Fig. 8A2
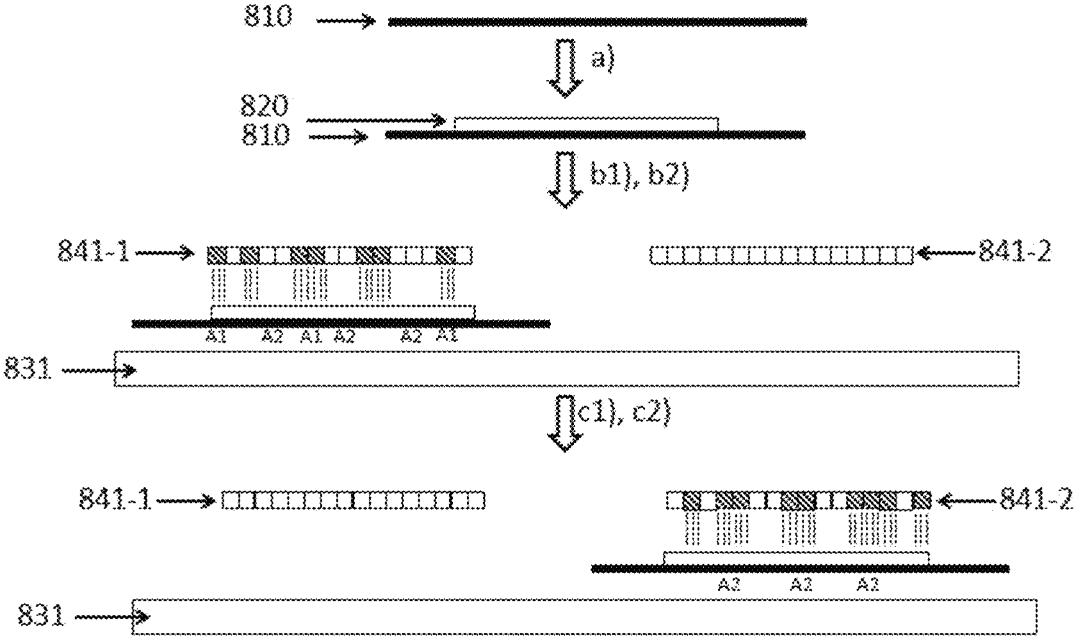

Fig. 8A3
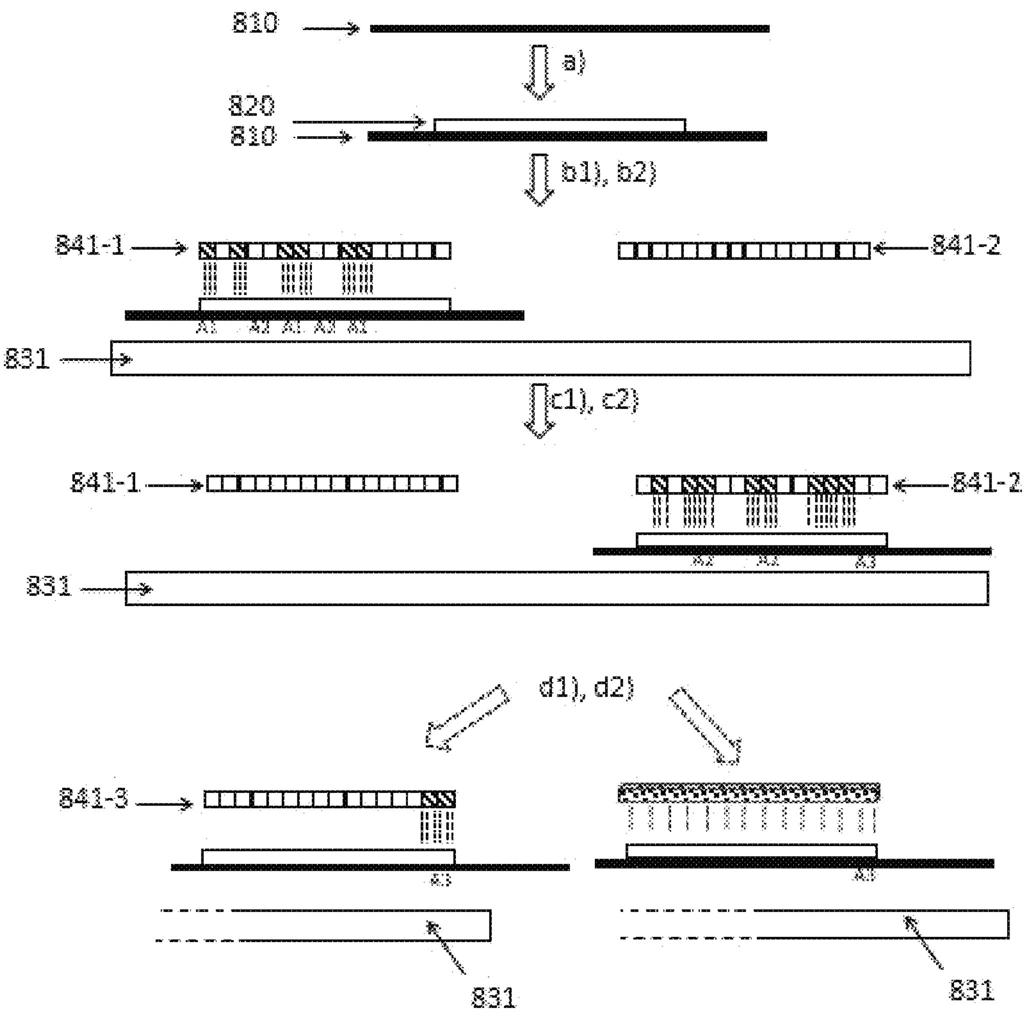

Fig. 9A1
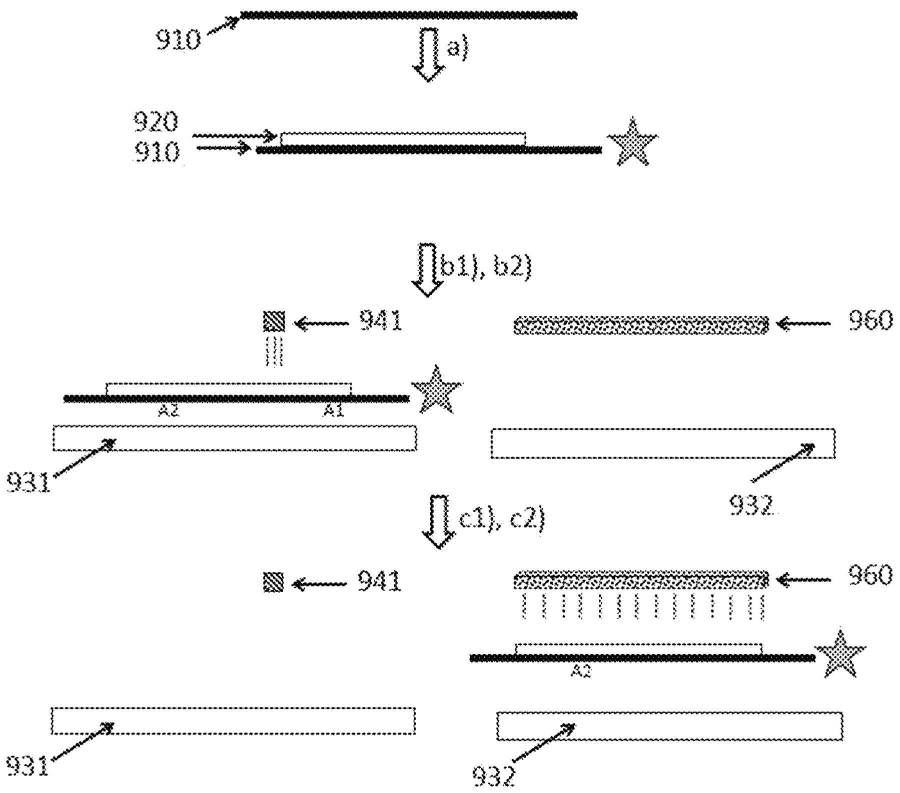
Fig. 9A2
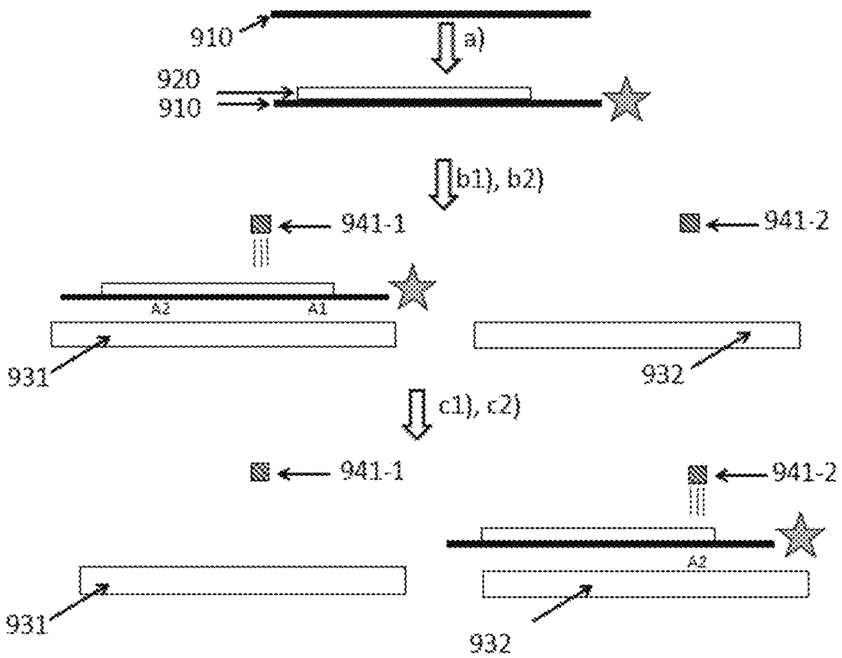

Fig. 9A3
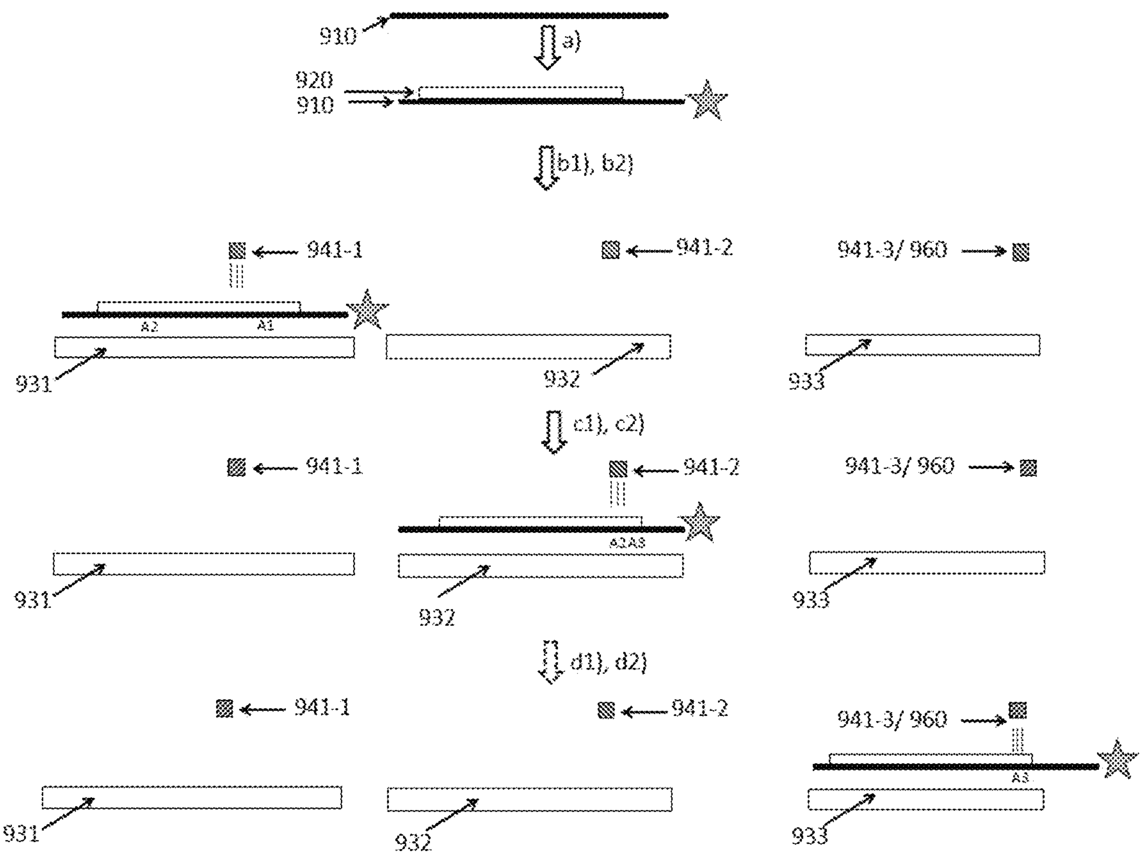

Fig. 10A1
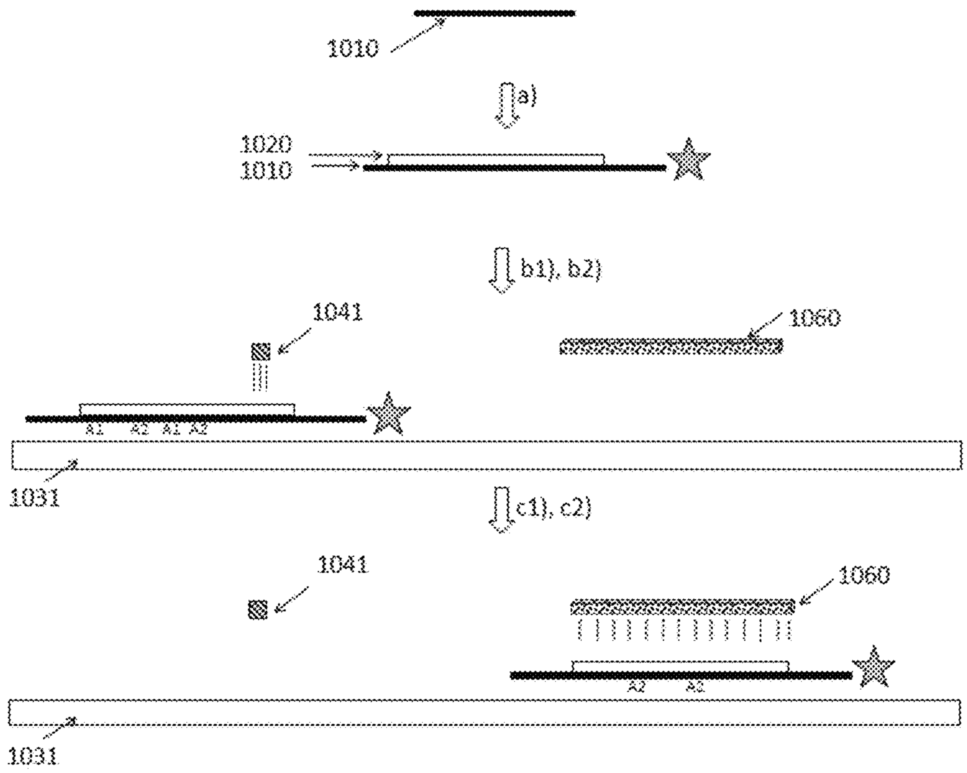
Fig. 10A2
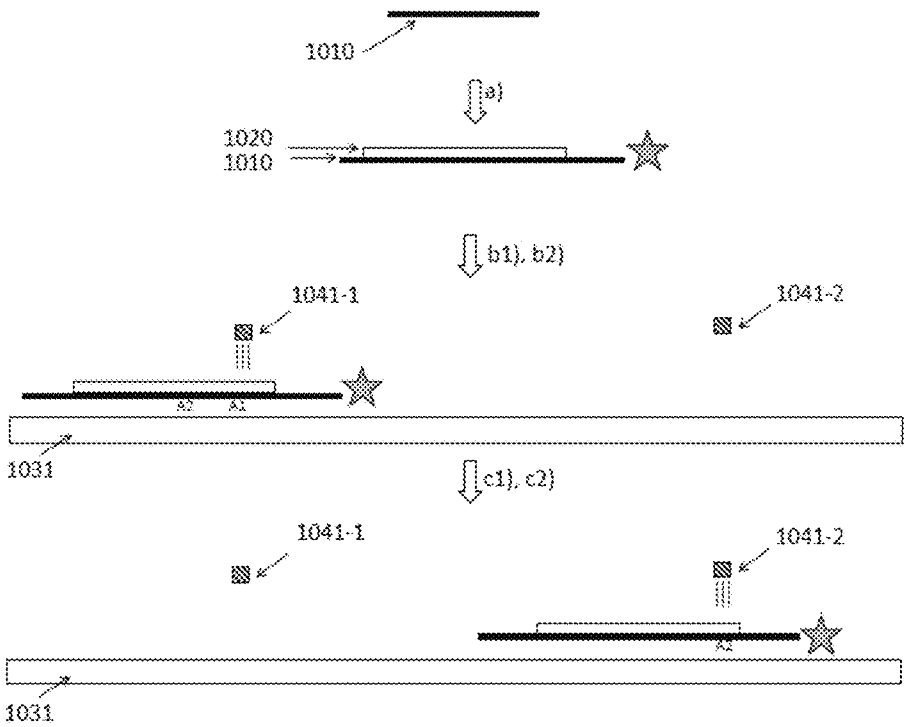

Fig. 10A3
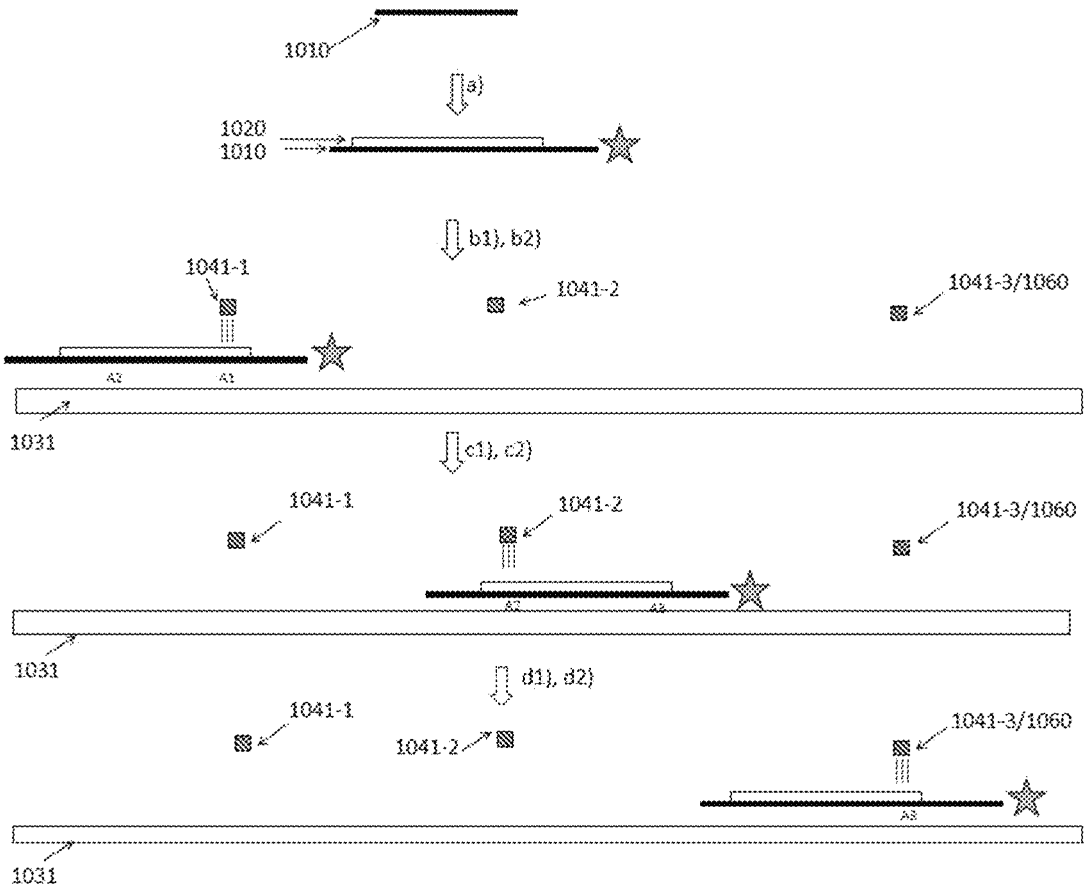

Fig. 11A1
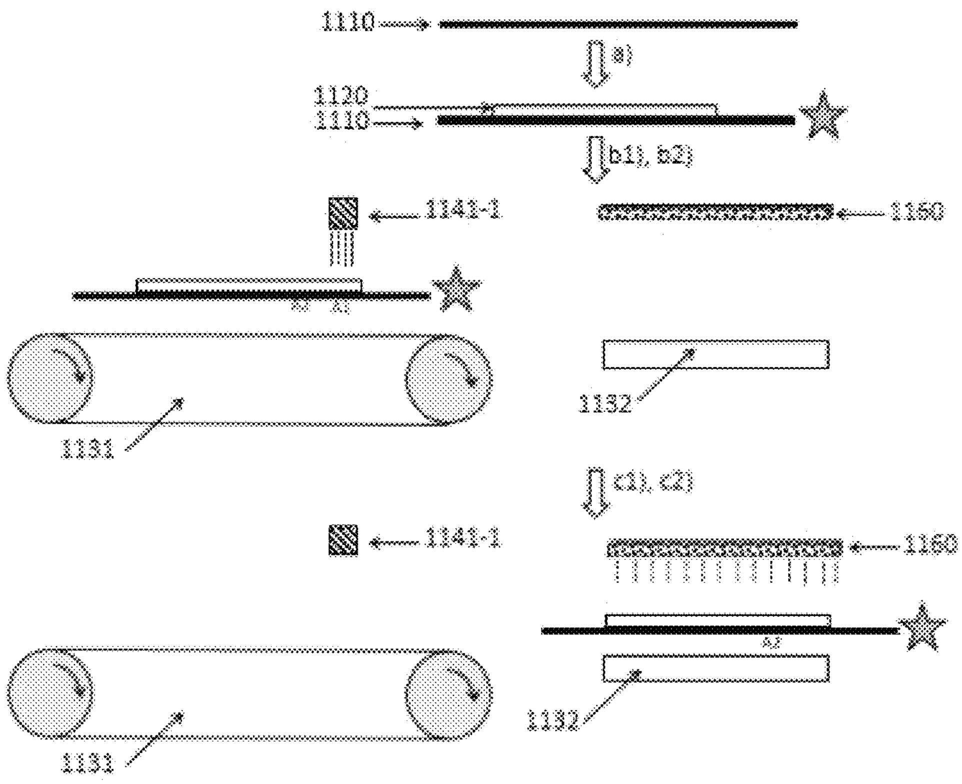
Fig. 11A2
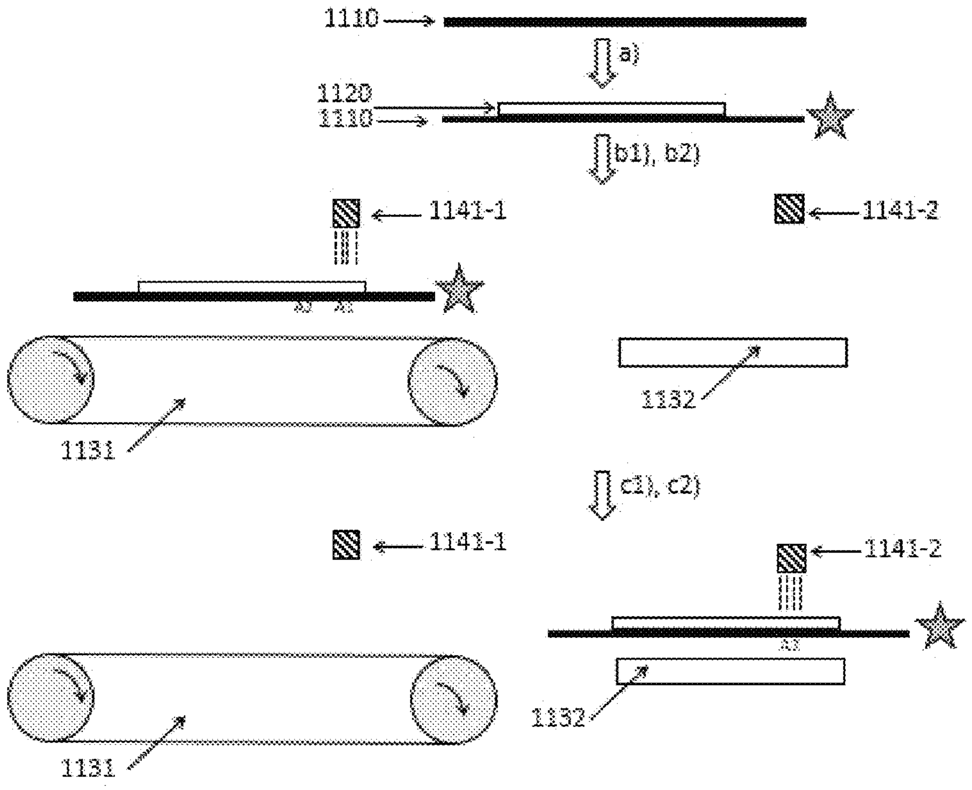

Fig.11A3
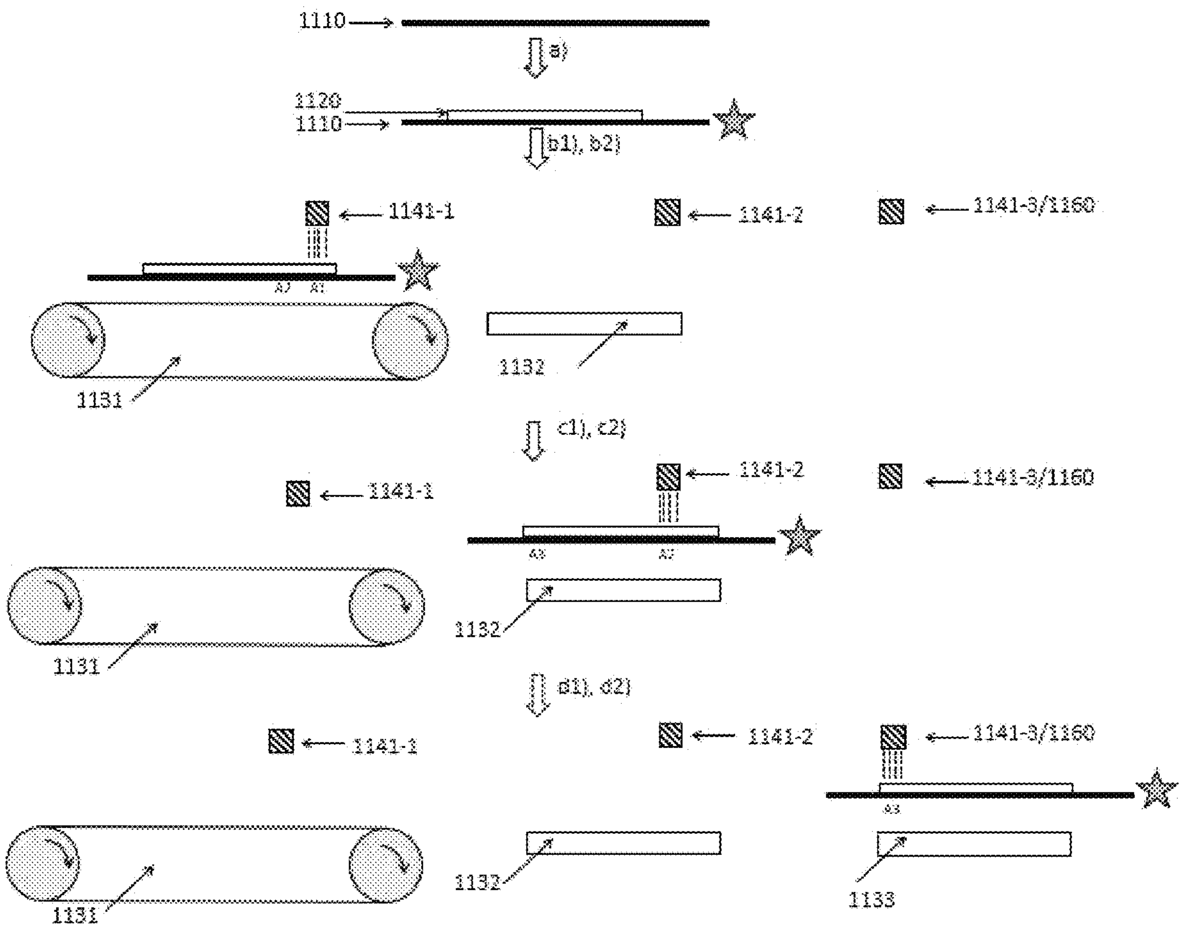

Fig. 12A1
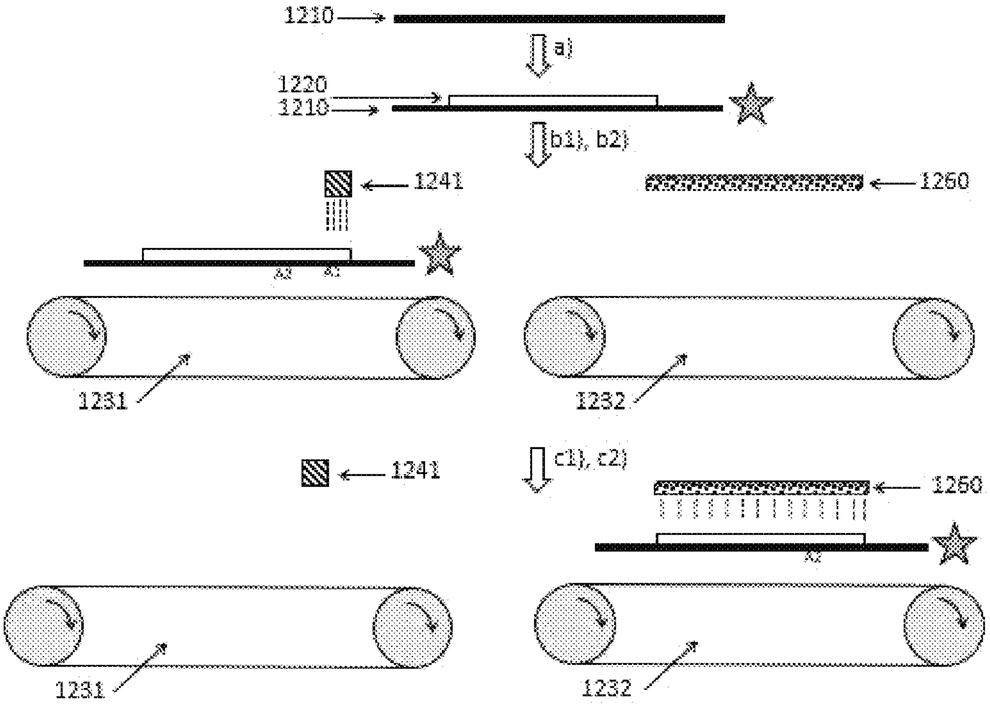
Fig. 12A2
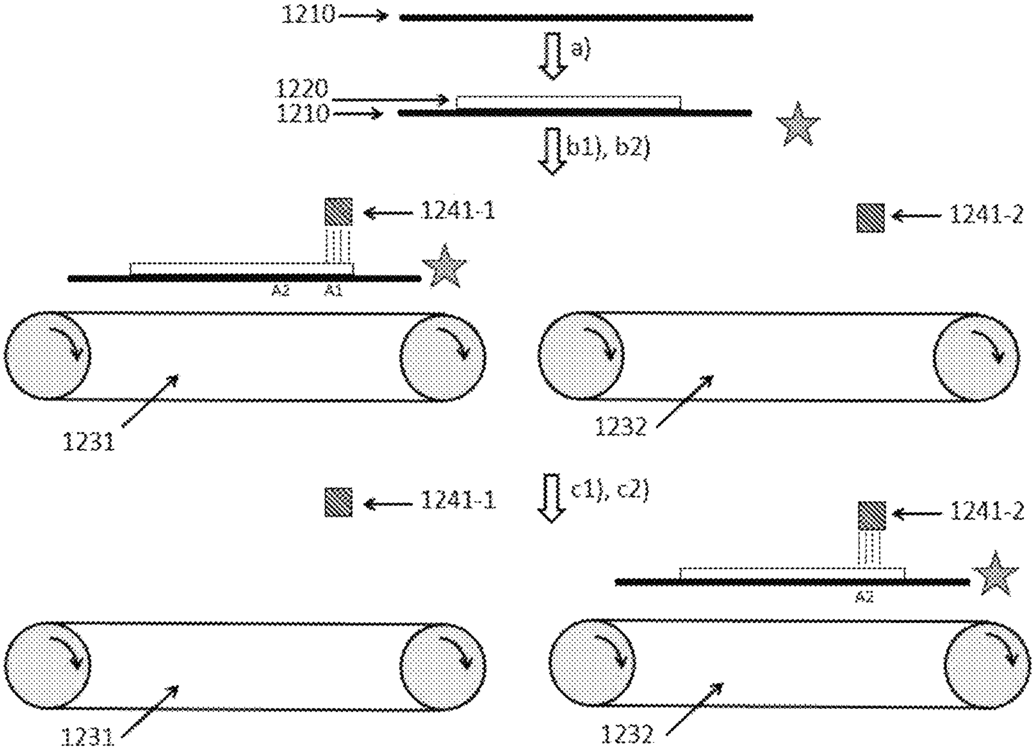

Fig. 12A3
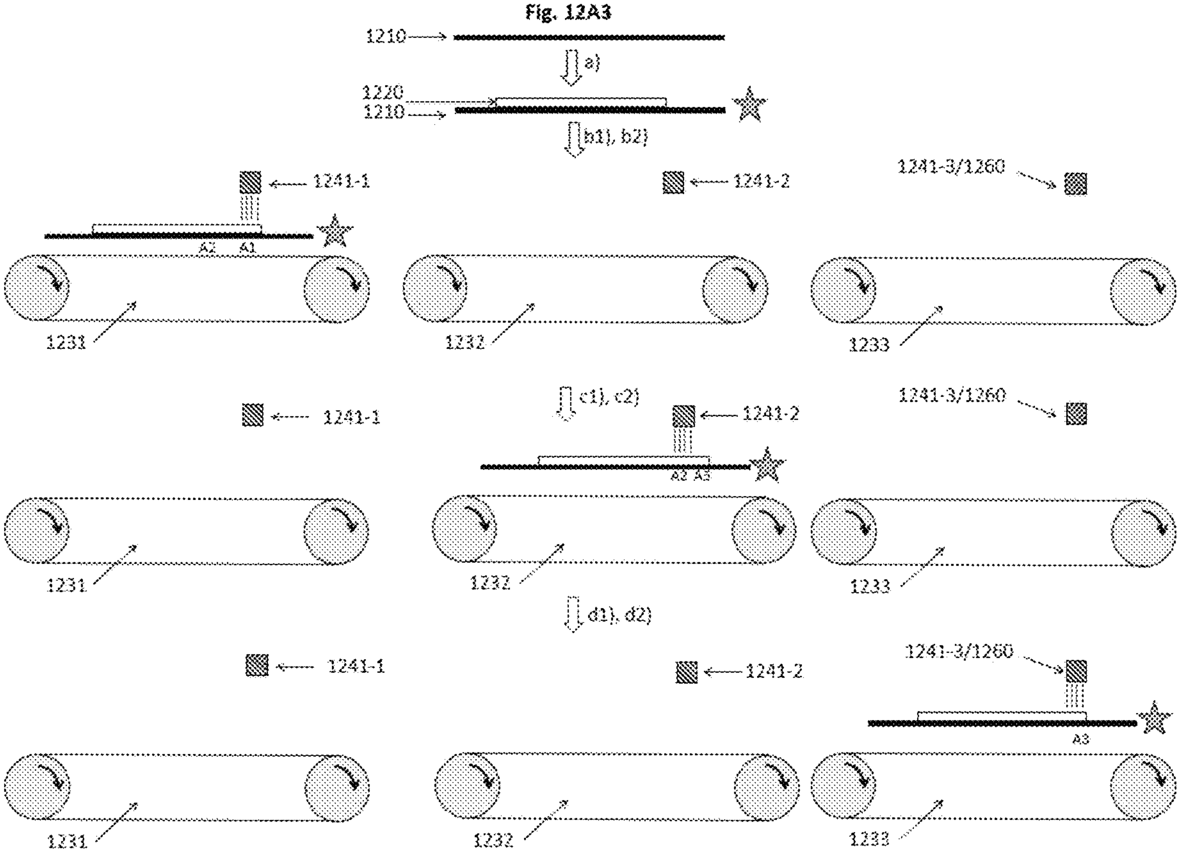

DEVICE FOR PRODUCING OPTICAL EFFECT LAYERS

CROSS REFERENCE TO RELATED APPLICATIONS

This application is a Divisional of application Ser. No. 17/422,166, filed on Jul. 9, 2021, and for which priority is claimed under 35 U.S.C. § 120; which is a U.S. national stage filing of PCT/EP2019/087072 filed on Dec. 27, 2019, which claims priority of application Ser. No. 19/151,899.2 filed on Jan. 15, 2019 in the European Patent Office, the entire contents of all of which are hereby incorporated by reference.

FIELD OF THE INVENTION

The present invention relates to the field of protecting value documents and value commercial goods against counterfeit and illegal reproduction. In particular, the present invention relates to processes for producing optical effect layers (OELs) comprising a motif made of at least two areas made of a single applied and cured layer and comprising magnetically oriented non-spherical magnetic or magnetizable particles using a selective curing performed by irradiating with an actinic radiation source.

BACKGROUND OF THE INVENTION

It is known in the art to use radiation curable inks, compositions or layers containing magnetic or magnetizable particles or pigments for the production of security elements also known as security features, e.g. in the field of security documents such as for example banknotes.

Security features, e.g. for security documents, can be classified into “covert” and “overt” security features. The protection provided by covert security features relies on the principle that such features are hidden to the human senses, typically requiring specialized equipment and knowledge for their detection, whereas “overt” security features are easily detectable with the unaided human senses, e.g. such features may be visible and/or detectable via the tactile sense while still being difficult to produce and/or to copy. The effectiveness of overt security features depends to a great extent on their easy recognition as a security feature, because users will only then actually perform a security check based on such security feature if they are aware of its existence and nature.

Magnetic or magnetizable particles in coatings allow for the production of magnetically induced images, designs and/or patterns through the application of a corresponding magnetic field, resulting in a local orientation of the magnetic or magnetizable particles in the unhardened coating, followed by curing the latter. This results in specific optical effects, i.e. fixed magnetically oriented images, designs or patterns which are highly resistant to counterfeit. The security elements based on oriented magnetic or magnetizable particles can only be produced by having access to the magnetic or magnetizable particles or a corresponding ink or coating composition comprising said particles, the particular technology employed to apply said ink or composition and to orient said pigment particles in the applied ink or coating composition, and methods for curing said composition comprising said particles to a cured state so as to fix the magnetic or magnetizable particles in their adopted positions and orientations.

A general process for producing OEL, where said OEL comprises a motif made of at least two areas made of a single cured layer, comprises i) applying on the substrate a UV curable ink or coating composition comprising magnetic or magnetizable particles so as to form a coating layer, said coating layer being in a first state; ii) exposing the coating layer to the magnetic field of a magnetic-field-generating device, thereby orienting the pigment particles, iii) curing one or more first areas of the coating layer to a second state so as to fix the magnetic or magnetizable particles in their adopted positions and orientations, said curing being performed by selectively irradiating the coating layer with a radiation source; iv) exposing the coating layer to the magnetic field of a magnetic-field-generating device thereby orienting the magnetic or magnetizable particles which are comprised in the coating layer still being after the first state due to the selective curing of step iii) and v) curing the coating layer so as to fix the magnetic or magnetizable particles in their new adopted positions and orientations.

A method for producing an OEL, where said OEL comprises a motif made of at least two areas made of a single cured layer, using a fixed photomask including one or more voids corresponding to a pattern to be formed as a part of an image on the coating layer being carried by the fixed substrate is disclosed, for example, in US 2011/221431 now U.S. Pat. No. 9,482,726. US 2011/221431 now U.S. Pat. No. 9,482,726 discloses a method wherein a fixed photomask comprising one or more openings corresponding to a pattern to be formed as a part of an image. The magnetically oriented coating layer is irradiated by a UV-source through said photomask, to achieve a selective curing below the openings of the photomask. However, the disclosed processes may result in the potential creation of shadow effects on the coating layer due to the constraints that a) the photomask may not touch the not yet cured ink layer, but must be disposed at a certain distance from it, and that b) the UV-source is necessarily an extended light source. This results in a low-resolution image and requires operation at low printing speeds due to the need for keeping in a fixed constellation the substrate, the photomask, and the UV-source during the exposure time.

Methods for producing OELs using a fixed photomask, wherein a coating layer is carried by a moving substrate, are disclosed in WO 2017/178651 A1, WO 2016/015973 A1, WO 2002/090002 A2, US 2010/021658 now U.S. Pat. No. 9,027,479. However, the disclosed processes may also result in the production of shadow effects on the coating layer and/or image blurring due to a substrate movement at industrial speeds during exposition to irradiation, without any possibility to implement a variable image information during printing.

Methods for producing OELs using a moving photomask and a moving substrate are also known in the art, for example, from WO 2016/193252 A1, WO 2016/083259 A1, EP 3 178 569 A1, EP 1 407 897 A1. However, the disclosed processes may also result in the production of shadow effects on the coating layer resulting in a low-resolution imaging.

For instance, WO 2016/015973 discloses a process for producing an OEL comprising a motif made of at least two areas made of a single hardened coating layer on a substrate. The process involves a step of exposing the coating layer comprising a plurality of magnetic or magnetizable pigment particles to a magnetic-field generating device and simultaneously or partially simultaneously hardening the coating layer to a second state so as to fix the magnetic or magnetizable pigment particles in their adopted positions and orientations, said hardening being performed through the substrate by irradiation with a UV-Vis radiation source located on the side of the substrate, said substrate being transparent to one or more actinic wavelengths emitted by the irradiation source. In one embodiment, the irradiation source is equipped with a photomask such that one or more substrate areas carrying the coating layer are not exposed to UV-Vis radiation. However, the disclosed processes may also result in the production of shadow effects and blurring on the coating layer as a result of partially exposed areas arising from the optical geometry of the system.

WO 02/090002 A2 discloses a method for producing images on coated articles. The method comprises the steps of i) applying a layer of magnetizable pigment coating in liquid form on a substrate, with the magnetizable pigment coating containing a plurality of magnetic non-spherical particles or flakes, ii) exposing the coating to a magnetic field and iii) solidifying the coating by exposure to electromagnetic radiation. During the solidifying step, an external photomask with voids may be positioned between the pigment coating and the electromagnetic radiation source. The photomask disclosed in WO 02/090002 A2, allows to solidify only the regions of the coating facing the voids of the photomask thereby allowing the orientation of the flakes to be fixed/frozen only in those regions. The flakes dispersed in the un-exposed parts of the pigment coating may be re-oriented, in a subsequent step, using a second magnetic field. The pattern formed by the selective solidifying with the help of a photomask allows for a higher resolution imaging than can be obtained by use of patterned magnetic fields or for patterns that cannot be achieved with simple magnetic fields. In this process, it is mandatory to keep the relative positions of the coated substrate, the photomask and the irradiation source in a same configuration during the solidifying step. As a consequence, the coated substrate may not be moved in a continuous translation movement in front of the fixed photomask and the electromagnetic radiation source.

It is known in the art of curing a coating or ink composition with the help of a UV radiation source, that the characteristics and the construction of the UV irradiation source and the precise exposure conditions of the coating or ink composition to the UV radiation source are crucial for obtaining a high-resolution image and a fast curing of the composition.

US 2012/0162344 now U.S. Pat. No. 8,633,954 discloses a system and a method for the selective curing of a coating of magnetic flakes with the help of a scanning laser beam which scans across a moving coated substrate. The selective curing is performed in a magnetic field thus allowing images of magnetically aligned flakes to be formed and fixed in orientation and position in the selected regions of the coating. The images have thus regions of cured aligned flakes and regions which are not yet cured and which can be re-oriented using a second magnetic field and cured with the help of a second irradiation. The scanning laser beam is moved to a plurality of positions across the path of the moving substrate to cure the coating of magnetically aligned flakes in the addressed regions.

WO 2017/021504 A1 discloses a use of a UV radiation unit comprising an array of light-emitting diodes (LEDs) for the UV curing of a coating layer disposed on a substrate. The array is formed of LED strings, each LED string is covered by a collimator lens producing an enlarged image of the UV radiation source on the substrate for realizing a larger working width. Thus, the use of such collimator lens, while allowing the reduction of the size of the UV radiation source, allows the curing of the whole width of a large moving web. However, this leads to a decreased UV radiation density resulting to longer curing times.

An article "Printing anisotropic appearance with magnetic flakes" (Thiago Pereira et al., ACM Transactions on Graphics, Vol. 36 (4), article 123, July 2017) discloses a use of electromagnets and a digital light processing (DLP) unit with one of its color LEDs replaced with a high-power 385 nm UV LED to selectively cure magnetically oriented magnetic pigment flakes in a coating layer located on a substrate. Said LED is powered with a current of 800 mA. Since the magnetic field is only uniform in a small area, it is necessary to project an image in a small area as well, thus an SLR lens is used in reverse to focus the projector onto the target. During a printing process, each image is projected on the substrate for twenty seconds to partially cure the resin and stop the flakes from realigning in magnetic fields. A drawback of this process is the loss of light intensity at the DLP, which leads to a rather slow curing process, which in turn does not allow to run the process at industrial speeds. Furthermore, the image produced by the DLP unit cannot be applied on a curved surface such as for example a printing cylinder, nor does it allow for a moving substrate.

Alternatively, LED Light Emitting Diode (LED) printing and LED-printers have been developed and have been disclosed for example in U.S. Pat. No. 6,137,518 which discloses an apparatus comprising an LED (Light Emitting Diode) array having a number of LEDs arranged in an array and configured to controllably emit light in accordance with image data. In LED-printers, a photosensitive drum is selectively exposed by an addressable LED array via a lens array, such as a SELFOC lens array. The exposed drum is then used to print toner onto a substrate, in the very same way as in a laser printer. The LED arrays used in LED-printers are high-density (at least 600 dpi), fully integrated linear LED arrays, having individually addressable LEDs and integrated addressing electronics. However, the principal shortcomings of LED-printer arrays in the present context are that i) they rely only on low intensity radiation, and ii) the emission intensity of their individual emitters is by far too low for curing a coating layer comprising magnetic or magnetizable pigment particles at a reasonable industrial speed.

A need remains for improved processes enabling the industrial production of optical effect layers (OELs) comprising a motif made of at least two areas made of a single applied and cured layer, wherein said processes uses an irradiation source while avoiding unnecessary losses of light density resulting in longer curing times and degrading the printing performance. Moreover, the processes should allow the production of OELs with at least two areas by selective irradiation to be defined by variable and customizable information, said information being implemented at the printing time.

SUMMARY OF THE INVENTION

Accordingly, it is an object of the present invention to overcome the deficiencies of the prior art as discussed above.

In a first aspect, the present invention provides a process for producing an optical effect layer (OEL) on a substrate (x10), the OEL comprising a motif made of at least two areas made of a single applied and cured layer, the process comprising the steps of:

a) applying, preferably by a printing process, on the substrate (x10) a radiation curable coating composition comprising non-spherical magnetic or magnetizable particles so as to form a coating layer (x20), the coating layer being in a first state, said first state being a liquid state;

b) b1) exposing the coating layer (x20) to the magnetic field of a first magnetic-field-generating device (x31) thereby orienting at least a part of the non-spherical magnetic or magnetizable particles, b2) at least partially curing one or more first areas of the coating layer (x20) to a second state so as to fix the non-spherical magnetic or magnetizable particles in their adopted positions and orientations; the curing being performed by irradiation with an actinic radiation LED source (x41) so as to at least partially cure the one or more first areas of the coating layer (x20) and such that one or more second areas of the coating layer (x20) are not exposed to irradiation, wherein step b2) is carried out partially simultaneously with or subsequently to, preferably partially simultaneously with, step b1), and c) at least partially curing the one or more second areas of the coating layer (x20) so as to fix the non-spherical magnetic or magnetizable particles in their adopted positions and orientations in the one or more second areas; the curing being performed by a radiation source, wherein the actinic radiation LED source (x41) comprises an array, preferably a linear array or a two dimensional array, of individually addressable actinic radiation emitters, and wherein the actinic radiation is projected onto the coating layer (x20) to form one or more projected images.

Preferably, the step c) described herein step c) consists of the two following steps: c1) exposing the coating layer (x20) to the magnetic field of either the first magnetic-field-generating device (x31) or of a second magnetic-field-generating device (x32) thereby orienting at least a part of the non-spherical magnetic or magnetizable particles, and c2) the step of at least partially curing the one or more second areas of the coating layer (x20) so as to fix the non-spherical magnetic or magnetizable particles in their adopted positions and orientations in the one or more second areas; the curing being performed by a radiation source, wherein said step c2) is carried out partially simultaneously with or subsequently to, preferably partially simultaneously with said step c1).

Also described herein are optical effect layers (OELs) produced by the process described herein as well as uses of said optical effect layers for the protection of a security document or security article against counterfeiting or fraud as well as uses for a decorative application.

Also described herein are security documents, security articles and decorative elements or objects comprising one or more optical effect layers (OELs) described herein.

Also described herein are devices for producing the optical effect layer (OEL) on the substrate (x10) described herein, said OEL comprising a motif made of at least two areas made of a single applied and cured layer and said device comprising:

i) a printing unit for applying on the substrate (x10) a radiation curable coating composition comprising non-spherical magnetic or magnetizable particles so as to form a coating layer (x20), ii) at least a first magnetic-field-generating device (x31) and optionally a second magnetic-field-generating device (x32) for orienting at least a part of the non-spherical magnetic or magnetizable particles of the coating layer (x20), iii) one or more actinic radiation LED sources (x41) comprising an array, preferably a linear array or a two dimensional array, of individually addressable actinic radiation emitters for the selective curing of one or more areas of the coating layer (x20), and iv) optionally one or more magnetic devices to carry out bi-axial orientation; and v) optionally a conveying means for conveying the substrate (x10) carrying the coating layer (x20) in the vicinity of the actinic radiation LED sources (x41), and vi) optionally a transferring device for concomitantly moving the substrate (x10) carrying the coating layer (x20) with the first magnetic-field-generating device (x31) and the optional second magnetic-field-generating device (x32).

The process described herein allow the production of optical effect layers (OELs) made of a single layer and comprising two or more areas made of a radiation cured coating composition comprising non-spherical magnetic or magnetizable pigment particles, wherein said two or more areas comprise non-spherical magnetic or magnetizable pigment particles oriented according to a different orientation pattern with high resolution. Advantageously, the process described herein uses the actinic radiation LED source (x41) comprising an array, which may be a linear (one dimensional) array or a two dimensional array, of individually addressable actinic radiation emitters described herein to selectively cure one or more first areas with improvement in terms of resolution, heat dissipation, curing speed and size of the required equipment to produce OELs. Furthermore, there is no moving parts prone to mechanical degradation or damage.

The irradiation of the actinic radiation LED source (x41) is directly (i.e. without the need of photomask) imaged onto the coating layer (x20) thus providing a maximum of irradiation intensity to the coating layer (x20) and support a high production speed. This allows for the combination of two or more different magnetic orientation images or patterns within one sole printed optical effect layer (OEL) in a single pass on the printing machine, avoiding further printing passes and the therewith associated losses of printing ink, as well as human resource and machine time. Due to the individually addressable actinic radiation emitters of the actinic radiation LED source (x41) described herein, the so-obtained selective curing allows to selectively transfer variable information to the optical effect layer, allowing for individualization or serialization.

BRIEF DESCRIPTION OF DRAWINGS

FIG. 2A-2E schematically illustrate a substrate (x20) carrying a coating layer (220) which is exposed to the irradiation of an actinic radiation LED source (241), wherein said source (241) comprises a two dimensional (2D) array of individually addressable actinic radiation emitters.

FIGS. 4A1-4A2, 5A1-5A2 and 6A1-A2 schematically illustrate processes for producing the optical effect layers (OELs) described herein, said process comprising the steps of a) applying on the substrate (x10) (substrates with a star on their right correspond to substrates in motion) the radiation curable coating composition comprising the non-spherical magnetic or magnetizable particles described herein; b) which consists of a step b1) of exposing the coating layer (x20) to the magnetic field of the first magnetic-field-generating device (x31) described herein a step b2) of at least partially curing the one or more first areas of the coating layer (x20) by irradiation with the actinic radiation LED source (x41) described herein; and c) at least partially curing the one or more second areas of the coating layer (x20) so as to fix the non-spherical magnetic or magnetizable particles in their adopted positions and orientations.

FIGS. 7A1-7A2, 8A1-8A2, 9A1-9A2, 10A1-10A2, 11A1-11A2, and 12A1-12A2 schematically illustrate processes for producing the optical effect layers (OELs) described herein, said process comprising the steps of a) applying on the substrate (x10) (substrates with a star on their right correspond to substrates in motion) the radiation curable coating composition comprising the non-spherical magnetic or magnetizable particles described herein; b) which consists of a step b1) of exposing the coating layer (x20) to the magnetic field of the first magnetic-field-generating device (x31) described herein a step b2) of at least partially curing the one or more first areas of the coating layer (x20) by irradiation with the actinic radiation LED source (x41) described herein; and c) consisting of a step c1) of exposing the coating layer (x20) to the magnetic field of either the first magnetic-field-generating device (x31) or of the second magnetic-field-generating device (x32) and c2) at least partially curing the one or more second areas of the coating layer (x20) so as to fix the non-spherical magnetic or magnetizable particles in their adopted positions and orientations.

FIGS. 7A3, 8A3, 9A3, 10A3, 11A3, and 12A3 schematically illustrate processes for producing the optical effect layers (OELs) described herein, said process comprising the steps of a) applying on the substrate (x10) (substrates with a star on their right correspond to substrates in motion) the radiation curable coating composition comprising the non-spherical magnetic or magnetizable particles described herein; b) which consists of a step b1) of exposing the coating layer (x20) to the magnetic field of the first magnetic-field-generating device (x31) described herein a step b2) of at least partially curing the one or more first areas of the coating layer (x20) by irradiation with the actinic radiation LED source (x41) described herein; c) consisting of a step c1) of exposing the coating layer (x20) to the magnetic field of either the first magnetic-field-generating device (x31) or of the second magnetic-field-generating device (x32) and c2) at least partially curing the one or more second areas of the coating layer (x20) so as to fix the non-spherical magnetic or magnetizable particles in their adopted positions and orientations; and optionally as step d) consisting of a step d1) of exposing the coating layer (x20) either to the magnetic field of a $n^{th}$ magnetic-field-generating device (x33) or to a $n^{th}$ region of the first magnetic-field generating device (x31) and d2) of at least partially curing the one or more $n^{th}$ areas of the coating layer (x20) so as to fix the non-spherical magnetic or magnetizable particles in their adopted positions and orientations.

DETAILED DESCRIPTION

Definitions

Figure 1A:
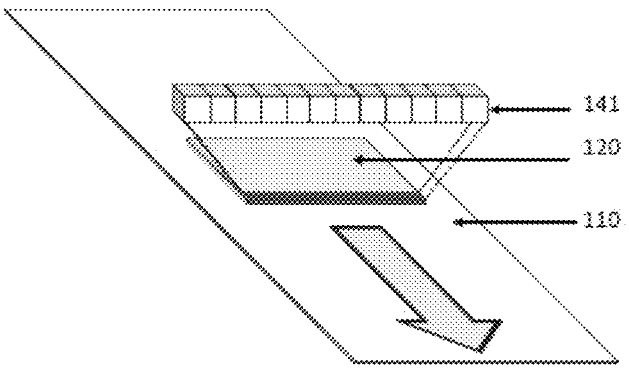
FIG. 1A-1D schematically illustrate a substrate (110) carrying a coating layer (120) which is exposed to the irradiation of an actinic radiation LED source (x11), wherein said source (141) comprises a linear (one dimensional, 1D) array of individually addressable actinic radiation emitters.

The following definitions are to be used to interpret the meaning of the terms discussed in the description and recited in the claims.

As used herein, the indefinite article "a" indicates one as well as more than one and does not necessarily limit its referent noun to the singular.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

The term "substantially orthogonal" refers to deviating not more than 10° from perpendicular/orthogonal alignment.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a composition comprising a compound A may include other compounds besides A. However, the term "comprising" also covers, as a particular embodiment thereof, the more restrictive meanings of "consisting essentially of" and "consisting of", so that for instance "a composition comprising A, B and optionally C" may also (essentially) consist of A and B, or (essentially) consist of A, B and C.

The term "coating composition" refers to any composition which is capable of forming an optical effect layer (OEL) of the present invention on a solid substrate and which can be applied preferably but not exclusively by a printing method. The coating composition comprises magnetic or magnetizable pigment particles and a binder.

The term "optical effect layer (OEL)" as used herein denotes a layer that comprises magnetic or magnetizable pigment particles and a binder, wherein the orientation of the magnetic or magnetizable pigment particles is fixed or frozen (fixed/frozen) within the binder.

The term "curing" is used to denote a process wherein the viscosity of a coating composition is increased so as to convert it into a state, i.e. a hardened or solid state, where the magnetic or magnetizable pigment particles are fixed/frozen in their current positions and orientations and can no longer move nor rotate.

Where the present description refers to "preferred" embodiments/features, combinations of these "preferred" embodiments/features shall also be deemed as disclosed as long as this combination of "preferred" embodiments/features is technically meaningful.

As used herein, the term "at least" is meant to define one or more than one, for example one or two or three.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

The present invention provides processes for producing optical effect layers (OELs) on a substrate (x10), wherein said OELs comprises a motif made of at least two areas made of a single applied and cured layer and wherein the at least two areas have a different orientation pattern of the magnetic or magnetizable pigment particles. In a first embodiment, said different orientation pattern is obtained by an at least partial disorientation of the magnetic or magnetizable pigment particles after the step b2) described herein, wherein said at least partial disorientation occurs in the one or more second areas of the coating layer (x20) which were not exposed to irradiation during step b1) described herein. In a second embodiment, said different orientation pattern is obtained by a further step of exposing the coating layer (x20) to the magnetic field of either the first magnetic-field-generating device (x31) or of the second magnetic-field-generating device (x32) described herein during step c1). The present invention also provides OELs obtained from said processes. The at least two areas of the motif may be adjacent, spaced apart or intertwined, preferably the at least two areas of the motif are adjacent or intertwined. The at least two areas may be continuous or discontinuous.

The processes for producing the optical effect layers (OELs) described herein comprise a step of a) applying, preferably by a printing process such as those described herein, on the substrate (x10) the radiation curable coating composition comprising non-spherical magnetic or magnetizable particles such as those described herein so as to form the coating layer (x20), a step b) comprising a step b1) exposing the coating layer (x20) to the magnetic field of a first magnetic-field-generating device (x31) thereby orienting at least a part of the non-spherical magnetic or magnetizable particles and, partially simultaneously with or subsequently to, preferably partially simultaneously with, said step b1), a step b2) at least partially curing one or more first areas of the coating layer (x20), said curing being performed by irradiation with the actinic radiation LED source (x41), preferably an actinic LED UV-Vis radiation source (x41), described herein so as to at least partially cure the one or more first areas of the coating layer (x20) such that one or more second areas of the coating layer (x20) are not exposed to irradiation. By using the actinic radiation LED source (x41), preferably the actinic LED UV-Vis radiation source (x41), described herein, the coating layer (x20) is irradiated at one or more specific and selected positions of the coating layer (x20) so as to form the one or more first areas of the coating layer (x20). After having at least partially cured the one or more first areas of the coating layer (x20), the process described herein further comprises a step c) of at least partially curing the one or more second areas of the coating layer (x20) so as to fix the non-spherical magnetic or magnetizable particles in their adopted positions and orientations in the one or more second areas; the curing being performed by a radiation source. Preferably, the step c) described herein consists of a step c1) of exposing the coating layer (x20) to the magnetic field of either a second region of the first magnetic-field-generating device (x31), said second region having a different pattern of magnetic field lines than the region of the first magnetic-field-generating device used during step b1), or of the second magnetic-field-generating device (x32) described herein thereby orienting at least a part of the non-spherical magnetic or magnetizable particles; and partially simultaneously with or subsequently to, preferably partially simultaneously with, said step c1), and a step c2) of at least partially curing the one or more second areas of the coating layer (x20), said curing being performed by the radiation source described herein. By "partially simultaneously", it is meant that both steps are partly performed simultaneously, i.e. the times of performing each of the steps partially overlap. In the context described herein, when curing b2)/c2) is performed partially simultaneously with the orientation step b1)/c1), it must be understood that curing becomes effective after the orientation so that the pigment particles orient before the complete or partial curing of the one or more first/second areas of the coating layer (x20).

The single applied and cured layer described herein is obtained by applying on the substrate (x10) described herein the radiation curable coating composition so as to form a coating layer (x20) (step a)), said coating layer being in a first state and by at least partially curing (steps b2) and c2)) said radiation curable coating composition with the actinic radiation LED source (x41) comprising the array of individually addressable actinic radiation emitters during said step b2) and with the radiation source during step c2), wherein said radiation source may be a actinic radiation LED source comprising the array of individually addressable actinic radiation emitters such as those described herein or may a standard radiation source being not-addressable (x60) such as for example not addressable carbon arc lamps, xenon arc lamps, medium-, high- and low-pressure mercury lamps, doped where appropriate with metal halides (metal halides lamps), microwave-excited metal vapor lamps, excimer lamps, superactinid fluorescent tubes, fluorescent lamps, argon incandescent lamps, flash lamps, photographic flood lights and light emitting diodes, to a second state so as to fix/freeze the non-spherical magnetic or magnetizable pigment particles in their adopted positions and orientations. The first and second states described herein can be provided by using a binder material that shows a sufficient increase in viscosity in reaction to an exposure to irradiation. That is, when the coating layer is at least partially cured, said layer converts into the second state, i.e. a highly viscous or hardened or solid state, where the non-spherical magnetic or magnetizable pigment particles are substantially fixed/frozen in their current positions and orientations and can no longer move nor rotate appreciably within the layer. The radiation curable coating composition must thus noteworthy have a first state, i.e. a liquid or pasty state, wherein the radiation curable coating composition is wet or soft enough, so that the non-spherical magnetic or magnetizable pigment particles dispersed in the radiation curable coating composition are freely movable, rotatable and/or orientable upon exposure to the magnetic field, and a second cured (e.g. solid) state, wherein the non-spherical magnetic or magnetizable pigment particles are fixed or frozen in their respective positions and orientations.

The process described herein comprises a step a) of applying onto the substrate (x10) surface described herein the radiation curable coating composition described herein so as to form a coating layer (x20), said coating composition being in a first physical state which allows its application as a layer and which is in a not yet cured/hardened (i.e. wet) state wherein the non-spherical magnetic or magnetizable pigment particles can move and rotate within the binder material. Since the radiation curable coating composition described herein is to be provided on a substrate (x10) surface, the radiation curable coating composition comprises at least a binder material such as those described herein and the non-spherical magnetic or magnetizable pigment particles, wherein said radiation curable coating composition is in a form that allows its processing on the desired printing or coating equipment. Preferably, the step consisting of applying on the substrate (x10) described herein the radiation curable coating composition described herein is carried out by a printing process preferably selected from the group consisting of screen printing, rotogravure printing and flexography printing.

Subsequently to, partially simultaneously with or simultaneously with, preferably subsequently to, the application of the radiation curable coating composition described herein on the substrate surface described herein (step a)), at least a part of the non-spherical magnetic or magnetizable pigment particles is oriented (step b1)) by exposing the radiation curable coating composition to the magnetic field of the first magnetic-field-generating device (x31) described herein, so as to align the non-spherical magnetic or magnetizable pigment particles along the magnetic field lines generated by the magnetic-field-generating device (x31). Subsequently to or partially simultaneously with, preferably partially simultaneously with, the step of orienting/aligning (step b1)) the non-spherical magnetic or magnetizable pigment particles by applying the magnetic field described herein, the orientation of at least a part of the non-spherical magnetic or magnetizable pigment particles is fixed or frozen (step b2)). Subsequently to the at least partial curing of the one or more first areas of the coating layer (x20) (step b2)), at least a part of the non-spherical magnetic or magnetizable pigment particles of the not yet at least partially cured one or more second areas is preferably oriented (step c1)) by exposing the coating layer (x20) to the magnetic field of the first magnetic-field-generating device (x31) or the second magnetic-field-generating device (x32) described herein, so as to align the non-spherical magnetic or magnetizable pigment particles along the magnetic field lines generated by said magnetic-field-generating device (x31, x32) (step c1)), wherein the pattern of the magnetic field lines of the first magnetic-field-generating device (x31) or the second magnetic-field-generating device (x32) is different from the one of the first magnetic-field-generating device (x31) during the first orienting step (step b1)). Subsequently to or partially simultaneously with, preferably partially simultaneously with, said second orientation step (step c1)), the one or more second areas of the coating layer (x20) are at least partially cured (step c2)).

Provided that the actinic radiation LED source (x41) used during step c) or during step c2) when a step c1) is carried out as described herein does not at least partially cure the whole surface of the coating layer (x20) such that one or more $n^{th}$ (third, fourth, etc.) areas of the coating layer (x20) are not exposed to irradiation and are not at least partially cured, the process described herein may further comprise n steps of dl) exposing the coating layer (x20) either to the magnetic field of a $n^{th}$ (third, fourth, etc.) magnetic-field-generating device (x33) or to a $n^{th}$ (third, fourth, etc.) region of the first magnetic-field generating device (x31). Subsequently to or partially simultaneously with, preferably partially simultaneously with, said $n^{th}$ orientation step (step d1)), the one or more $n^{th}$ areas of the coating layer (x20) are at least partially cured (step d2). The process described herein my further comprise one or more additional steps d), said one or more additional steps d) including steps dl) and d2) and being carried out after step c), wherein the step d1) include exposing the coating layer (x20) to the magnetic field of a magnetic-field-generating device thereby orienting at least a part of the non-spherical magnetic or magnetizable particles, and wherein the magnetic-field-generating device may be the same magnetic-field-generating device as the one used during step b1) and/or c1) but in a different region, said different region having a different pattern of magnetic field lines than the pattern of magnetic field lines of the first region of the magnetic-field-generating device (x31) or may be a different magnetic-field-generating device.

The process described herein my further comprise one or more additional steps b-bis), said one or more additional steps b-bis) including the steps b1-bis) and b2-bis) and being carried out after step b), wherein the step b1-bis) includes exposing the coating layer (x20) to the magnetic field of a magnetic-field-generating device thereby orienting at least a part of the non-spherical magnetic or magnetizable particles, and wherein the magnetic-field-generating device may be the same magnetic-field-generating device as the one used during step b1) but in a different region, said different region having a different pattern of magnetic field lines than the pattern of magnetic field lines of the first region of the magnetic-field-generating device (x31) or may be a different magnetic-field-generating device.

Radiation, preferably UV-Vis light radiation, curing is used, since these technologies advantageously lead to very fast curing processes and hence drastically decrease the preparation time of any article comprising the OEL described herein. Moreover, radiation, preferably UV-Vis light radiation, curing has the advantage of producing an almost instantaneous increase in viscosity of the radiation curable coating composition described herein after exposure to irradiation, thus minimizing any further movement of the particles. In consequence, any loss of orientation after the magnetic orientation steps can essentially be avoided. Accordingly, particularly preferred are radiation curable coating compositions selected from the group consisting of UV-visible radiation curable coating compositions. Preferably, the at least partially curing step b2) and/or at least partially curing step c2) are independently carried out by irradiation with UV-visible light (i.e. UV-Vis light radiation curing) Therefore, suitable coating compositions for the present invention include radiation curable compositions that may be cured by UV-visible light radiation (hereafter referred as UV-Vis curable). According to one particularly preferred embodiment of the present invention, the radiation curable coating composition described herein is a UV-Vis curable coating composition. Particularly preferred is radiation-curing by photo-polymerization, under the influence of actinic irradiation having a wavelength component in the UV or blue part of the electromagnetic spectrum (typically 200 nm to 650 nm; more preferably 300 nm to 450 nm, even more preferably 350 nm to 420 nm). UV-Vis curing advantageously allows very fast curing processes and hence drastically decreases the preparation time of the OEL described herein, documents and articles and documents comprising said OEL.

Preferably, the radiation curable coating composition described herein comprises one or more compounds selected from the group consisting of radically curable compounds and cationically curable compounds. The UV-Vis curable coating composition described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby harden the coating composition. Radically curable compounds are cured by free radical mechanisms typically including the activation by radiation of one or more photoinitiators, thereby generating radicals which in turn initiate the polymerization so as to harden the coating composition. Depending on the monomers, oligomers or prepolymers used to prepare the binder comprised in the UV-Vis curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diary) iodonium salts), oxonium (e.g. triaryloxonium salts) and sulfonium salts (e.g. triarylsulphonium salts), as well as mixtures of two or more thereof. Other examples of useful photoinitiators can be found in standard textbooks. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis curable coating compositions are preferably present in a total amount from about 0.1 wt-% to about 20 wt-%, more preferably about 1 wt-% to about 15 wt-%, the weight percents being based on the total weight of the UV-Vis curable coating compositions.

The radiation curable coating composition described herein, preferably the UV-Vis curable coating compositions described herein, as well as the coating layer (x20) described herein comprise non-spherical magnetic or magnetizable pigment particles. Preferably, the magnetic or magnetizable pigment particles described herein are present in an amount from about 5 wt-% to about 40 wt-%, more preferably about 10 wt-% to about 30 wt-%, the weight percentages being based on the total weight of the radiation curable coating composition. The non-spherical magnetic or magnetizable pigment particles are preferably prolate or oblate ellipsoid-shaped, platelet-shaped or needle-shaped particles or a mixture of two or more thereof and more preferably platelet-shaped particles.

The non-spherical magnetic or magnetizable pigment particles described herein have, due to their non-spherical shape, non-isotropic reflectivity with respect to incident electromagnetic radiation for which the hardened/cured binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction.

In the OELs described herein, the non-spherical magnetic or magnetizable pigment particles described herein are dispersed in the coating layer (x20) comprising an at least partially cured binder material that fixes the orientation of the non-spherical magnetic or magnetizable pigment particles. The binder material is at least in its cured or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum. Accordingly, the non-spherical magnetic or magnetizable pigment particles contained in the binder material in its hardened or solid state and their orientation-dependent reflectivity can be perceived through the binder material at some wavelengths within this range. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 μm of the cured binder material as present in the OEL (not including the platelet-shaped magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the hardened binder material (not including the platelet-shaped magnetic or magnetizable pigment particles) in accordance with well-established test methods, e.g. DIN 5036-3 (1979-11). If the OEL serves as a machine readable security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range.

Suitable examples of non-spherical magnetic or magnetizable pigment particles described herein include without limitation pigment particles comprising a magnetic metal selected from the group consisting of cobalt (Co), iron (Fe), gadolinium (Gd) and nickel (Ni), magnetic alloys of iron, manganese, cobalt, nickel and mixtures of two or more thereof; magnetic oxides of chromium, manganese, cobalt, iron, nickel and mixtures of two or more thereof; and mixtures of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical magnetic or magnetizable pigment particles described herein include without limitation pigment particles comprising a magnetic layer M made from one or more of a magnetic metal such as cobalt (Co), iron (Fe), gadolinium (Gd) or nickel (Ni), and a magnetic alloy of iron, cobalt or nickel, wherein said platelet-shaped magnetic or magnetizable pigment particles may be multilayered structures comprising one or more additional layers. Preferably, the one or more additional layers are layers A independently made from one or more materials selected from the group consisting of metal fluorides such as magnesium fluoride ($MgF_2$), silicon oxide (SiO), silicon dioxide ($SiO_2$), titanium oxide ($TiO_2$), zinc sulphide (ZnS) and aluminum oxide ($Al_2O_3$), more preferably silicon dioxide ($SiO_2$); or layers B independently made from one or more materials selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

At least part of the non-spherical magnetic or magnetizable pigment particles described herein may be constituted by non-spherical optically variable magnetic or magnetizable pigment particles and/or non-spherical magnetic or magnetizable pigment particles having no optically variable properties. Preferably, at least a part of the non-spherical magnetic or magnetizable pigment particles described herein is constituted by non-spherical optically variable magnetic or magnetizable pigment particles. In addition to the overt security provided by the colorshifting property of non-spherical optically variable magnetic or magnetizable pigment particles, which allows easily detecting, recognizing and/or discriminating an article or security document carrying an ink, radiation curable coating composition, coating or layer comprising the non-spherical optically variable magnetic or magnetizable pigment particles described herein from their possible counterfeits using the unaided human senses, the optical properties of the platelet-shaped optically variable magnetic or magnetizable pigment particles may also be used as a machine readable tool for the recognition of the OEL. Thus, the optical properties of the non-spherical optically variable magnetic or magnetizable pigment particles may simultaneously be used as a covert or semi-covert optical security feature in an authentication process wherein the optical (e.g. spectral) properties of the pigment particles are analyzed. The use of non-spherical optically variable magnetic or magnetizable pigment particles in radiation curable coating compositions for producing an OEL enhances the significance of the OEL as a security feature in security document applications, because such materials (i.e. non-spherical optically variable magnetic or magnetizable pigment particles) are reserved to the security document printing industry and are not commercially available to the public.

Moreover, and due to their magnetic characteristics, the non-spherical magnetic or magnetizable pigment particles described herein are machine readable, and therefore coatings or layers made of the radiation curable coating compositions described herein and comprising those pigment particles may be detected for example with specific magnetic detectors. Radiation curable coating compositions comprising the non-spherical magnetic or magnetizable pigment particles described herein may therefore be used as a covert or semi-covert security element (authentication tool) for security documents.

As mentioned above, preferably at least a part of the non-spherical magnetic or magnetizable pigment particles is constituted by non-spherical optically variable magnetic or magnetizable pigment particles. These can more preferably be selected from the group consisting of non-spherical magnetic thin-film interference pigment particles, non-spherical magnetic cholesteric liquid crystal pigment particles, non-spherical interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferably, the reflector layers described herein are independently made from one or more materials selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more materials selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicon dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more materials selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co), and/or a magnetic alloy comprising nickel (Ni), iron (Fe) and/or cobalt (Co), and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a Cr/$MgF_2$/Al/M/Al/$MgF_2$/Cr multilayer structure, wherein M a magnetic layer comprising nickel (Ni), iron (Fe) and/or cobalt (Co), and/or a magnetic alloy comprising nickel (Ni), iron (Fe) and/or cobalt (Co), and/or a magnetic oxide comprising nickel (Ni), iron (Fe) and/or cobalt (Co).

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 which is hereby incorporated by reference in its entirety.

Magnetic thin film interference pigment particles described herein are typically manufactured by a conventional deposition technique for the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to platelet-shaped pigment particles which have to be further processed by grinding, milling (such as for example jet milling processes) or any suitable method so as to obtain pigment particles of the required size. The resulting product consists of flat platelet-shaped pigment particles with broken edges, irregular shapes and different aspect ratios. Further information on the preparation of suitable platelet-shaped magnetic thin film interference pigment particles can be found e.g. in EP 1 710 756 A1 and EP 1 666 546 A1 which are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical magnetic or magnetizable pigment particles described herein may be surface treated so at to protect them against any deterioration that may occur in the radiation curable coating composition and/or to facilitate their incorporation in the radiation curable coating composition; typically corrosion inhibitor materials and/or wetting agents may be used.

The radiation curable coating compositions described herein, preferably the UV-Vis curable coating compositions described herein, may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV reactivity and stability (photosensitizers and photostabilizers), the adhesion properties, the antistatic properties, the storage stability (polymerization inhibitors) etc. Additives described herein may be present in the radiation curable coating composition described herein, preferably the UV-Vis curable coating compositions described herein, in amounts and in forms known in the art, including so-called nano-materials where at least one of the dimensions of the additive is in the range of 1 to 1000 nm.

The radiation curable coating compositions described herein, preferably the UV-Vis curable coating compositions described, may further comprise one or more marker substances or taggants and/or one or more machine readable materials selected from the group consisting of magnetic materials (different from the non-spherical magnetic or magnetizable pigment particles described herein), luminescent materials, electrically conductive materials and infrared-absorbing materials. As used herein, the term “machine readable material” refers to a material which exhibits at least one distinctive property which is detectable by a device or a machine, and which can be comprised in a coating so as to confer a way to authenticate said coating or article comprising said coating by the use of a particular equipment for its detection and/or authentication.

The radiation curable coating compositions described herein, preferably the UV-Vis curable coating compositions described, may be prepared by dispersing or mixing the non-spherical magnetic or magnetizable pigment particles described herein and the one or more additives when present in the presence of the binder material described herein, thus forming liquid compositions. When present, the one or more photoinitiators may be added to the composition either during the dispersing or mixing step of all other ingredients or may be added at a later stage, i.e. after the formation of the liquid coating composition.

The processes described herein allow the production of OELs with at least two areas made of the single applied and cured layer either by a magnetic orientation step (step b1)) and an at least partial disorientation or preferably by at least two magnetic orientation steps (steps b1) and c1)) and by at least two at least partial curing steps, wherein a selective irradiation obtained by using at least during step b2) the actinic radiation LED source (x41) comprising the array of individually addressable actinic radiation emitters described herein. A final curing step may be carried out either by using a radiation source being either an actinic radiation LED source (x41) comprising the array of individually addressable actinic radiation emitters such as those described herein for the selective curing described herein or the standard radiation source being not-addressable (x60) described herein. The selective curing is obtained by curing one or more subsets of pixels, wherein said selective curing of obtained by selectively addressing the emitters of the actinic radiation LED source (x41) described herein, preferably obtained by selectively addressing the emitters of the actinic radiation LED source (x41) described herein according to one or more bitmap patterns of the image pixels to be at least partially cured. In particular, one or more individually addressable actinic radiation emitters of the actinic radiation LED source (x41) described herein are switched on while other one or more individually addressable actinic radiation emitters are switched off in a dynamic and selective manner. Alternatively, in some embodiments, the emitters corresponding to the image pixels may be addressed all at once.

Figures 1B, 1C, 1D:
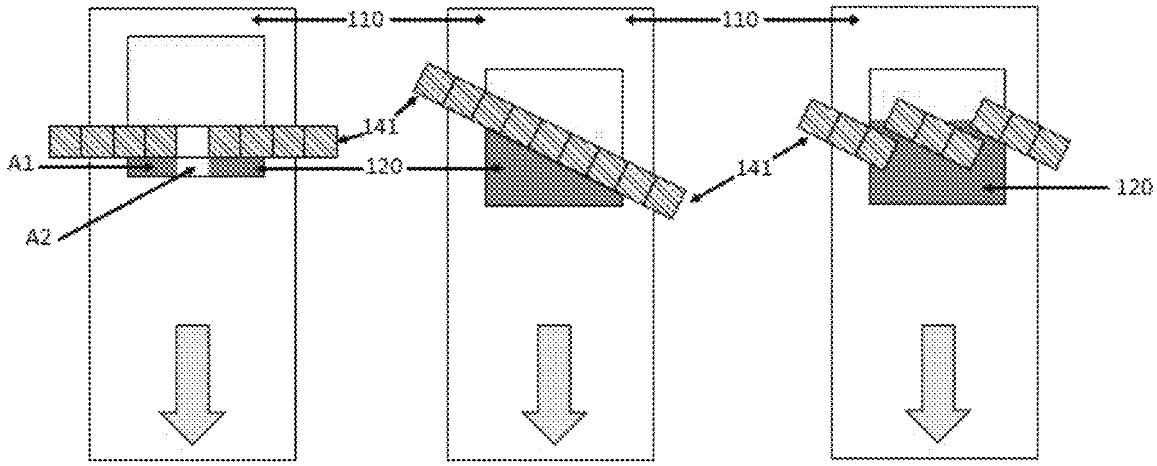

As shown in FIGS. 1 and 2, the substrate (x10) carrying the coating layer (x20) is exposed to the irradiation of the actinic radiation LED source (x41), wherein said source (x41) comprises either a linear (one dimensional, 1D) array of individually addressable actinic radiation emitters (see FIG. 1A-D) or a two dimensional (2D) array of individually addressable actinic radiation emitters (see FIG. 2A-E) and wherein the actinic radiation is projected onto the coating layer (x20) to form one or more projected images consisting of the one or more first areas of the coating layer (x20) described herein. By "addressable", it is meant that the radiation emitters of the actinic LED source may be switched on and off individually or as distinct subsets by a processor. The addressable actinic radiation emitters may be dynamically switching on and off by a processor according to the final design of the optical effect layer (OEL). As shown in FIG. 1B, one or more of the addressable actinic radiation emitters of the actinic radiation LED source (x41) may be switched off ($5^{th}$ emitter in FIG. 1B) so as to selectively at least partially cure the one or more first areas of the coating layer (x20), wherein one of the at least partially cured one or more first areas of the coating layer (x20) is depicted as a dark grey area (A1) and the one of the one or more not yet cured areas of the coating layer (x20) is depicted as a light grey area (A2) in FIG. 1B. As shown in FIGS. 1 and 2, the width of the linear or two dimensional array of the individually addressable actinic radiation emitters of the actinic radiation LED source (x41) may be larger than the width of the coating layer (x20) and the actinic radiation is projected, preferably by a projection means (not shown), onto the coating layer (x20). As shown in FIG. 2, the surface of the two dimensional array of the individually addressable actinic radiation emitters of the actinic radiation LED source (x41) may be larger than the surface of the coating layer (x20) and the actinic radiation is projected, preferably by a projection means (not shown), onto the coating layer (x20).

The steps b1) and b2) provides one or more first areas having magnetically oriented non-spherical magnetic or magnetizable particles, wherein the magnetic orientation pattern has been fixed/frozen in said one or more first areas by the selective curing done by irradiation with the actinic radiation LED source (x41) described herein, wherein said one or more first areas have a shape defined by the selectively and individually addressed actinic radiation emitters of the actinic radiation LED source (x41), i.e. by the switching on and off of the individually addressable actinic radiation emitters of the actinic radiation LED source (x41), preferably according to one or more bitmap patterns.

The step c) described herein or the steps c1) and c2) carried out in the preferred process described herein provide one or more second areas having magnetically oriented non-spherical magnetic or magnetizable particles, wherein the magnetic orientation pattern has been fixed/frozen in said one or more second areas by curing either with a standard radiation source being not-addressable (x60) (i.e. the curing being non-selectively carried out on the whole surface of the coating layer (x20)), wherein said one or more second areas having the negative shape of the one or more first areas defined by the selective curing of step b2), or by a further selective curing done by irradiation with an actinic radiation LED source (x41) such as those described herein, wherein said one or more second areas have a shape defined by the selectively and individually addressed actinic radiation emitters, i.e. by the switching on and off of the individually addressable actinic radiation emitters of the actinic radiation LED source (x41), preferably according to one or more bitmap patterns.

Should an actinic radiation LED source (x41) such as those described herein be used during step c) or step c2) so that one or more $n^{th}$ (e.g. third, fourth, etc.) areas are not exposed to the selective irradiation with the actinic radiation LED source (x41), at least a part of the spherical magnetic or magnetizable particles in the one or more not yet cured $n^{th}$ (e.g. third, fourth, etc.) areas may be magnetically oriented during a subsequent step d1) of exposing the coating layer (x20) to the magnetic field of a $n^{th}$ (e.g. third, fourth, etc.) magnetic-field-generating device, wherein said $n^{th}$ (e.g. third, fourth, etc.) magnetic-field-generating device may be a different magnetic-field-generating device from the magnetic-field-generating device used during step b1 and/or c1) or may be the same magnetic-field-generating device but in another different region, said different region having a different pattern of magnetic field lines than the pattern of magnetic field lines of the region of the magnetic-field-generating device used during step b1). Subsequently to or partially simultaneously with, preferably partially simultaneously with said step d1)), a step d2) of at least partially curing the one or more $n^{th}$ areas of the coating layer (x20) to a second state so as to fix the non-spherical magnetic or magnetizable particles in their adopted positions and orientations according to the pattern of magnetic field lines of the $n^{th}$ magnetic-field-generating device; the curing being performed by irradiation with the standard radiation source being not-addressable (x60) described herein or with an actinic radiation LED source (x41) such as those described herein.

Preferably, the one or more first areas and/or the one or more second areas and/or the one or more $n^{th}$ (e.g. third, fourth, etc.) areas of the coating layer (x20) described herein independently have the form or the shape of an indicium. As used herein, the term «indicium» and "indicia" shall mean any forms including without limitation symbols, alphanumeric symbols, motifs, letters, words, numbers, logos and drawings. As described herein, the one or more first areas, optionally one or more second areas and optionally one or more $n^{th}$ areas, have a shape defined by the selectively and individually addressed actinic radiation emitters of the actinic radiation LED source (x41, x41-1, x41-2, etc.), preferably according to one or more bitmap patterns. In particular, the emitters of the actinic radiation LED source (x41) are addressed according to one or more bitmap patterns of the image pixels to be at least partially cured, wherein said one or more bitmap patterns may be identical for all produced optical effect layers (OELs), or may represent variable information (individualization or serialization) such as for example a code, a serial number, a logo, a drawing or a name (variable indicia).

During the step b1) of the process described herein, the substrate (x10) carrying the coating layer (x20) may be in motion or may be static with respect to the first magnetic-field-generating device (x31). Should the substrate (x10) be in motion, said substrate may follow a flat path or a curved path. During the step b2) of the process described herein, the substrate (x10) carrying the coating layer (x20) may be in motion or may be static with respect to the actinic radiation LED source (x41) comprising the array of individually addressable actinic radiation LED. During the step c1) of the process described herein, the substrate (x10) carrying the coating layer (x20) may independently be in motion or may be static with respect to the first magnetic-field-generating device (x31) or second magnetic-field-generating device (x32), respectively. During the step c) or step c2) of the process described herein, the substrate (x10) carrying the coating layer (x20) may be in motion or may be static with respect to the radiation source being optionally an actinic radiation LED source (x41) comprising the array of individually addressable actinic radiation LED such as described herein or with respect to the standard radiation source being not-addressable (x60). In all embodiments described herein, the actinic radiation LED source (x41) and the standard radiation source being not-addressable (x60) are static and fixed, and serve as a reference frame for the substrate (x10) carrying the coating layer (x20) and for the magnetic-field-generating device(s) (x31, x32).

For processes with the substrate (x10) carrying the coating layer (x20) being in motion with respect to the actinic radiation LED source (x41) during step b2) and optionally during step c) or step c2), the substrate (x10) carrying the coating layer (x20) is conveyed in a plan substantially orthogonal to the optical axis of the individually addressable actinic radiation emitters of the actinic radiation LED source (x41).

Motion of the substrate (x10) carrying the coating layer (x20) in the vicinity of the actinic radiation LED sources (x41) may be carried out with conventional conveying means such as brushes, rollers, blades, springs, suction devices, clamps, belts and cylinders. The conveying means may be adapted to the type of printing presses known to the person skilled in the art.

According to one embodiment, the substrate (x10) carrying the coating layer (x20) described herein is in motion with respect to the actinic radiation LED source (x41) when exposed to the irradiation of said actinic radiation LED source (x41) during step b2) and optionally during step c) or step c2). For processes with the coating layer (x20) being in motion (see arrow FIGS. 1 and 2), the selective irradiation with the actinic radiation LED source (x41) is carried out with the actinic radiation LED source (x41) comprising the linear array of individually addressable actinic radiation emitters (see FIG. 1A) and the at least partial curing is carried out in succession while the substrate (x10) carrying the coating layer (x20) is in motion, or the two dimensional array of individually addressable actinic radiation emitters (see FIG. 2B), wherein the individually addressable actinic radiation emitters may be switched on and off individually for each array.

For processes of this embodiment using the actinic radiation LED source (x41) comprising the linear array of individually addressable actinic radiation emitters described herein (see FIG. 1A), selective irradiation is carried out at by individually switching on and off the emitters in a time-dependent manner while the substrate (x10) carrying the coating layer (x20) is in motion. For processes of this embodiment using the actinic radiation LED source (x41) comprising the two dimensional array of individually addressable actinic radiation emitters described herein (see FIG. 2B), selective irradiation is carried out either by individually switching on and off the emitters in a time-dependent manner while the substrate (x10) carrying the coating layer (x20) is in motion, or by switching on the individual emitters corresponding to the image pixels all at once during a very short time (flash curing). Advantageously, and in embodiments wherein the substrate (x10) carrying the coating layer (x20) is moving, the individually addressable actinic radiation emitters of the two dimensional array may be switched on and off in such a way that the projected image synchronously follows the moving substrate (x10), thus increasing the irradiation time and enhancing the curing efficiency.

For example, FIG. 1B depicts a linear array of nine individually addressable emitters (number chosen for clarity reasons) wherein eight emitters are switched on at a given time whereas one emitter (the fifth from the left) is switched off. The area of the coating layer (x20) irradiated by the eight switched on emitters is depicted as a grey area and corresponds to the at least one first area that is at least partially cured in step b2), whereas the area under the fifth switched-off emitter corresponds to the not yet cured area that will be subsequently cured, either selectively or using a standard curing means (x60) in step c2). As shown in FIG. 1B, the actinic radiation LED source (x41) comprising the linear array of individually addressable actinic radiation emitters described herein may be disposed in a substantially orthogonal direction with respect to the motion of the substrate (x10) carrying the coating layer (x20).

As shown in FIG. 10, the actinic radiation LED source (x41) comprising the linear array of individually addressable actinic radiation emitters described herein may be disposed in a skew arrangement, preferably with an angle between about 5° and about 45°, with respect to the motion of the substrate (x10) carrying the coating layer (x20). Alternatively, in order to reduce the footprint of the equipment, the individually addressable actinic radiation emitters described herein may be arranged in multiple segments that together form the linear array in a skew disposition (FIG. 1D), each segment having an angle preferably between about 5° and about 45° with respect to the motion of the substrate (x10) carrying the coating layer (x20). Advantageously, the disposition of the actinic radiation LED source (x41) comprising the linear array of individually addressable actinic radiation emitters is chosen such as to allow an optimization of the space of the equipment to produce the optical effect layers (OELs) and/or to improve the resolution of the so-obtained OELs and/or to help heat dissipation and/or to enhance the curing efficiency.

As shown in FIG. 2B, the actinic radiation LED source (x41) comprising the two dimensional array of individually addressable actinic radiation emitters described herein may be disposed in a substantially orthogonal direction with respect to the motion of the substrate (x10) carrying the coating layer (x20).

All arrays of the actinic radiation LED source (x41) building the two dimensional array of individually addressable actinic radiation emitters described herein may be substantially aligned (FIG. 2C), may be disposed in an offset arrangement (FIG. 2D) or may be disposed in a staggered arrangement (FIG. 2E), depending on space constraints and/or heat dissipation requirements and/or desired resolution and/or curing efficiency.

According to another embodiment, the substrate (x10) carrying the coating layer (x20) described herein is not in motion, i.e. is static, with respect to the actinic radiation LED source (x41) when exposed to the irradiation of said actinic radiation LED source (x41) during step b2) and optionally during step c2). For processes with the coating layer (x20) being static (see FIG. 2A and FIG. 2C-E), the selective irradiation with the actinic radiation LED source (x41) is carried out with the actinic radiation LED source (x41) comprising the two dimensional array of individually addressable actinic radiation emitters (see FIG. 2A) described herein, by switching on said individually addressable radiation emitters according to a bitmap pattern. In this case, all the arrays of the actinic radiation LED source (x41) comprising the two dimensional array of individually addressable actinic radiation emitters described herein are preferably substantially aligned (FIG. 2C) or disposed in a staggered arrangement (FIG. 2E).

Figure 3:
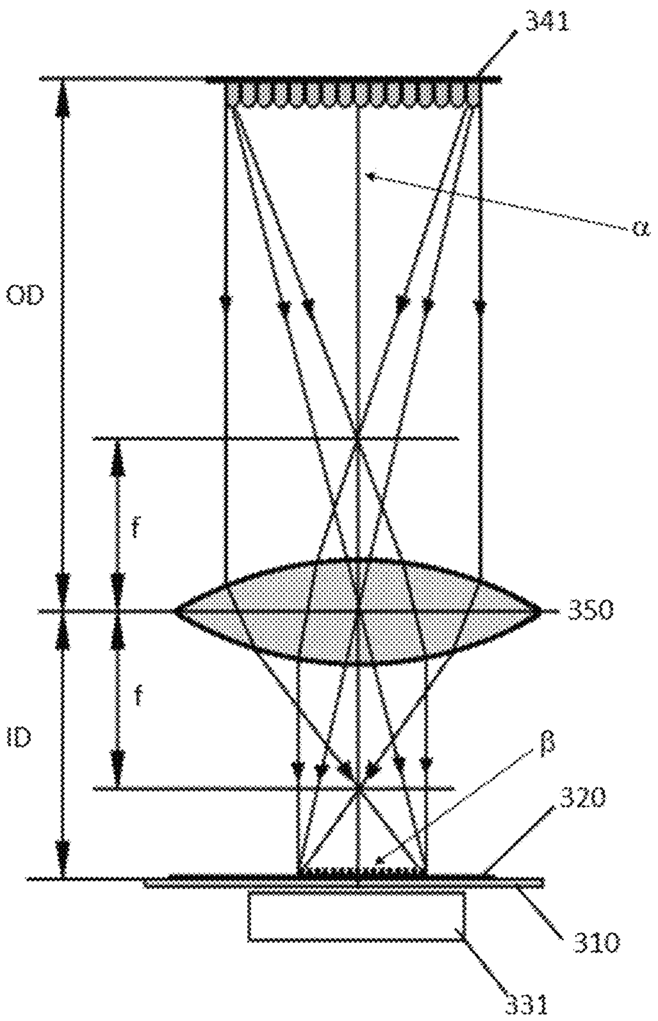
FIG. 3 schematically illustrates an embodiment wherein the selective curing of the coating layer (320) with the actinic radiation LED source (341) comprising the array of individually addressable actinic radiation emitters is performed by means of a projection means (350).

As described herein, the steps b1) and step b2) of the process described herein are preferably partially simultaneously carried out, wherein the irradiation of the one or more first areas of the coating layer (x20) with the actinic radiation LED source (x41) comprising the array of individually addressable actinic radiation emitters is preferably substantially orthogonal to the substrate (x10) surface said irradiation being projected on the coating layer (x20) to form one or more projected images (β in FIG. 3).

Preferably and as shown in FIG. 3, the selective curing of the coating layer (320) with the actinic radiation LED source (341) comprising the array of individually addressable actinic radiation emitters is performed by means of a projection means (350) such as for example a projection lens (350), wherein the optical axis (a) of the projection means (350) is preferably substantially orthogonal to the substrate (310) surface.

For processes with the substrate (x10) carrying the coating layer (x20) being in motion with respect to the actinic radiation LED source (x41), the substrate (x10) carrying the coating layer (x20) is preferably conveyed in a direction substantially orthogonal to both the array of individually addressable actinic radiation emitters of the actinic radiation LED source (x41) and the optical axis of the projection means (x50) during step b2) and optionally c) or step c2)). Preferably and as shown in FIG. 3, the projection means (350), preferably the lens (350) of focal lens f, is disposed between the actinic radiation LED source (341) and the coating layer (320) at an object distance OD from the actinic radiation LED source (341) and at an image distance ID from the coating layer (320) so that the irradiation with the actinic radiation LED source (341) onto the coating layer (320) is carried out under size reduction of the one or more projected images of said actinic radiation LED source (341). As shown in FIG. 3, when irradiation with the actinic radiation LED source (341) onto the coating layer (320) is carried out under size reduction, the width of the array of the individually addressable actinic radiation emitters of the actinic radiation LED source (341) may be larger than the width of the coating layer (320) and the irradiation is concentrated onto the coating layer (320) by the projection means (350), preferably the lens (350), in order to increase the resolution of the projected image and/or the local intensity of said irradiation and/or favoring heat dissipation of the actinic radiation LED source (341).

The use of the projection means (x50) described herein for the irradiation of the coating layer (x20) with the actinic radiation LED source (x41) comprising the array of individually addressable actinic radiation emitters under size reduction advantageously during step b2) and optionally during c) or step c2)) allows to use actinic radiation LED sources (x41) comprising large array(s) of individually addressable actinic radiation emitters in order to improve the resolution of the cured images and/or improve curing efficiency and/or improve heat dissipation. Typical examples of projection means (x50) include without limitation conventional spherical converging lenses, aspherical lenses, Fresnel lenses, freeform lenses, refractive index variable lenses, spherical mirrors, aspherical mirrors, multiple lenses (objectives); combination of prisms, mirrors and lenses systems; liquid adjustable lenses as well as lenses having surface varying profile to adapt to a non-flat coating layer.

According to one embodiment and as described herein, the substrate (x10) carrying the coating layer (x20) described herein is not in motion, i.e. is static, with respect to the actinic radiation LED source (x41) when exposed to the irradiation of the actinic radiation LED source (x41) during step b2) and optionally during step c) or step c2). The selective irradiation of the coating layer (x20) is carried out with the actinic radiation LED source (x41) comprising the two dimensional array of individually addressable actinic radiation emitters, wherein said emitters are switched on according to one or more first patterns, preferably one or more bitmap patterns, having the same shape as the one or more first areas of the coating layer (x20) to be at least partially cured with said actinic radiation LED source (x41); the same applies for the one or more second areas when an actinic radiation LED source (x41) comprising the two dimensional array of individually addressable actinic radiation emitters is used during step c) or step c2). Examples of processes of this embodiment are illustrated in FIGS. 4 7 and 8.

According to one embodiment shown in FIG. 4A1, the steps b) and c) of the process described herein are carried out in a static manner, wherein the substrate (410) carrying the coating layer (420) is not in motion (i.e. is static) during steps b1) and b2) and step c, wherein the radiation sources (441, 460) are not in motion (i.e. are static). As shown in FIG. 4A1, the process described herein comprises i) a step b1) of exposing the coating layer (420) to the magnetic field of a first static magnetic-field-generating device (431) such as those described herein and, preferably partially simultaneously with said step b1), a step b2) of at least partially curing one or more first areas (A1) of the coating layer (420) with the actinic radiation LED source (441) comprising the two dimensional array of individually addressable actinic radiation emitters described herein so as to form at least partially cured one or more first areas (A1) of the coating layer (420), preferably according to a bitmap pattern, while one or more second areas (A2) of the coating layer (420) are not yet at least partially cured; and ii) a step c) of at least partially curing the one or more second areas (A2) of the coating layer (420) with the standard radiation source being not-addressable (460), wherein the individually addressable actinic radiation emitters of the actinic radiation LED source (441) are switched on according to a first pattern during step b2).

According to one embodiment shown in FIG. 4A2, the steps b) and c) of the process described herein are carried out in a static manner, wherein the substrate (410) carrying the coating layer (420) is not in motion (i.e. is static) during steps b1) and b2) and step c, wherein the actinic radiation source (441) is not in motion (i.e. are static). As shown in FIG. 4A2, the process described herein comprises i) a step b1) of exposing the coating layer (420) to the magnetic field of a first static magnetic-field-generating device (431) such as those described herein and, preferably partially simultaneously with said step b1), a step b2) of at least partially curing one or more first areas (A1) of the coating layer (420) with the actinic radiation LED source (441) comprising the two dimensional array of individually addressable actinic radiation emitters described herein so as to form at least partially cured one or more first areas (A1) of the coating layer (420), preferably according to a bitmap pattern, while one or more second areas (A2) of the coating layer (420) are not yet at least partially cured; and, ii) a step c) of at least partially curing the one or more second areas (A2) of the coating layer (420) with the same actinic radiation LED source (441) comprising the two dimensional array of individually addressable actinic radiation emitters as used during step b2), wherein the individually addressable actinic radiation emitters of the actinic radiation LED source (441) are switched on according to a first pattern during step b2) and to a second pattern during step c2), said first and second patterns being different from each other, wherein the second pattern used in step c2) corresponds to the negative of the first pattern used in step b2). Alternatively, the step c) may be carried out by switching on all individually addressable actinic radiation emitters of the actinic radiation LED source (441) at the same time to cure the one or more second areas (A2) and to cure the whole coating layer (420).

According to one embodiment shown in FIG. 7A1, the steps b) and c) of the process described herein are carried out in a static manner, wherein the substrate (710) carrying the coating layer (720) is not in motion (i.e. is static) during steps b1) and b2) and steps c1) and c2), wherein the radiation sources (741, 760) are not in motion (i.e. are static) and wherein the first magnetic-field-generating device (731) used during step b1) is replaced by a second first magnetic-field-generating device (732) during step c1). As shown in FIG. 7A1, the process described herein comprises i) a step b1) of exposing the coating layer (720) to the magnetic field of a first static magnetic-field-generating device (731) such as those described herein and, preferably partially simultaneously with said step b1), a step b2) of at least partially curing one or more first areas (A1) of the coating layer (720) with the actinic radiation LED source (741) comprising the two dimensional array of individually addressable actinic radiation emitters described herein so as to form at least partially cured one or more first areas (A1) of the coating layer (720), preferably according to a bitmap pattern, while one or more second areas (A2) of the coating layer (720) are not yet at least partially cured; and, after having replaced the first magnetic-field-generating device (731) by a second magnetic-field-generating device (732) such as those described herein, said second magnetic-field-generating device (732) having a pattern of magnetic field lines which is different from the pattern of magnetic field lines of the first magnetic-field-generating device, ii) a step c1) of exposing the coating layer (720) to the magnetic field of the second static magnetic-field-generating device (732) and, after having replaced the actinic radiation LED source (741) by a standard radiation source being not-addressable (760), preferably partially simultaneously with said step c1), a step c2) of at least partially curing the one or more second areas (A2) of the coating layer (720) with the standard radiation source being not-addressable (760), wherein the individually addressable actinic radiation emitters of the actinic radiation LED source (741) are switched on according to a first pattern during step b2).

According to one embodiment shown in FIG. 7A2-3, the steps b) and c) of the process described herein are carried out in a static manner, wherein the substrate (710) carrying the coating layer (720) is not in motion (i.e. is static) during steps b1) and b2) and steps c1) and c2), wherein the actinic radiation source (741) is not in motion (i.e. are static) and wherein the first magnetic-field-generating device (731) used during step b1) is replaced by a second magnetic-field-generating device (732) during step c1). As shown in FIG. 7A2, the process described herein comprises i) a step b1) of exposing the coating layer (720) to the magnetic field of a first static magnetic-field-generating device (731) such as those described herein and, preferably partially simultaneously with said step b1), a step b2) of at least partially curing one or more first areas (A1) of the coating layer (720) with the actinic radiation LED source (741) comprising the two dimensional array of individually addressable actinic radiation emitters described herein so as to form at least partially cured one or more first areas (A1) of the coating layer (720), preferably according to a bitmap pattern, while one or more second areas (A2) of the coating layer (720) are not yet at least partially cured; and, after having replaced the first magnetic-field-generating device (731) by a second magnetic-field-generating device (732) such as those described herein, said second magnetic-field-generating device (732) having a pattern of magnetic field lines which is different from the pattern of magnetic field lines of the first magnetic-field-generating device (731), ii) a step c1) of exposing the coating layer (720) to the magnetic field of the second static magnetic-field-generating device (732) and, preferably partially simultaneously with said step c1), a step c2) of at least partially curing the one or more second areas (A2) of the coating layer (720) with the same actinic radiation LED source (741) comprising the two dimensional array of individually addressable actinic radiation emitters as used during step b2), wherein the individually addressable actinic radiation emitters of the actinic radiation LED source (741) are switched on according to a first pattern during step b2) and to a second pattern during step c2), said first and second patterns being different from each other, wherein the second pattern used in step c2) corresponds to the negative of the first pattern used in step b2). Alternatively, the step c2) may be carried out by switching on all individually addressable actinic radiation emitters of the actinic radiation LED source (741) at the same time to cure the one or more second areas (A2) and to cure the whole coating layer (720).

As shown in FIG. 7A3 and provided that the actinic radiation LED source (741) used during step c2) does not at least partially cure the whole surface of the coating layer (720) such that one or more $n^{th}$ (third, fourth, etc.) areas (A3) of the coating layer (720) are not exposed to irradiation and are not at least partial cured, the process described herein may further comprise n steps of dl) exposing the coating layer (720) to the magnetic field of a $n^{th}$ (third, fourth, etc.) static magnetic-field-generating device (733) and, preferably partially simultaneously with said step d1), a step d2) of at least partially curing the one or more $n^{th}$ (third, fourth, etc.) areas (A3) of the coating layer (720) with either the same actinic radiation LED source (741) comprising the two dimensional array of individually addressable actinic radiation emitters as used during steps b2) and c2), wherein the individually addressable actinic radiation emitters of the actinic radiation LED source (741) are switched on according to a first pattern during step b2), to a second pattern during step c2), and to a $n^{th}$ (third, fourth, etc.) pattern during step d2) said first, second and $n^{th}$ patterns being different from each other's (see FIG. 7A3 left) or with a standard radiation source being not-addressable (760) (see FIG. 7A3 right). Alternatively, the step d2) may be carried out by switching on all individually addressable actinic radiation emitters of the actinic radiation LED source (741) at the same time to cure the one or more $n^{th}$ (third, fourth, etc.) areas (A3) and to cure the whole coating layer (720).

According to one embodiment shown in FIG. 8A1, the steps b) and c) of the process described herein are carried out in a static manner, wherein the substrate (810) carrying the coating layer (820) is not in motion (i.e. is static) during steps b1) and b2) and steps c1) and c2), wherein the radiation sources (841, 860) are not in motion (i.e. are static), wherein a single static magnetic-field-generating device (831) is used during step b1) and c1), and wherein the substrate (810) carrying the coating layer (820) is moved to different regions of the magnetic-field-generating device (831) having different patterns of magnetic field lines instead of using different first and second magnetic-field-generating devices. As shown in FIG. 8A1, the process described herein comprises i) a step b1) of exposing the coating layer (820) to the magnetic field of a first region of the single static magnetic-field-generating device (831) such as those described herein and, preferably partially simultaneously with said step b1), a step b2) of at least partially curing one or more first areas (A1) of the coating layer (820) with the actinic radiation LED source (841) comprising the two dimensional array of individually addressable actinic radiation emitters described herein so as to form at least partially cured one or more first areas (A1) of the coating layer (820) while one or more second areas (A2) of the coating layer (820) are not yet at least partially cured; and, after having moved the substrate (810) carrying the coating layer (820) to a second region of the single static magnetic-field-generating device (831) having a different pattern of magnetic field lines than the pattern of magnetic field lines of the first region of the magnetic-field-generating device (831), ii) a step c1) of exposing the coating layer (820) to the magnetic field of the second region of the single static magnetic-field-generating device (831) and, preferably partially simultaneously with said step c1), a step c2) of at least partially curing the one or more second areas (A2) of the coating layer (820) with a standard radiation source being not-addressable (860), wherein the individually addressable actinic radiation emitters of the actinic radiation LED source (841) are switched on according to one or more first patterns during step b2).

According to one embodiment shown in FIG. 8A2-3, the steps b) and c) of the process described herein are carried out in a static manner, wherein the substrate (810) carrying the coating layer (820) is not in motion (i.e. is static) during steps b1) and b2) and steps c1) and c2), wherein the radiation sources (841-1, 841-2) are not in motion (i.e. are static), wherein a single static magnetic-field-generating device (831) is used during step b1) and c1), and wherein the substrate (810) carrying the coating layer (820) is moved to different regions of the single static magnetic-field-generating device (831) having different patterns of magnetic field lines instead of using different first and second magnetic-field-generating. As shown in FIG. 8A2, the process described herein comprises i) a step b1) of exposing the coating layer (820) to the magnetic field of a first region of the single static magnetic-field-generating device (831) such as those described herein and, preferably partially simultaneously with said step b1), a step b2) of at least partially curing one or more first areas (A1) of the coating layer with the actinic radiation LED source (841-1) comprising the two dimensional array of individually addressable actinic radiation emitters described herein so as to form at least partially cured one or more first areas (A1) of the coating layer (820) while one or more second areas (A2) of the coating layer (820) are not yet at least partially cured; and, after having moved the substrate (810) carrying the coating layer (820) to a second region of the single static magnetic-field-generating device (831) having a different pattern of magnetic field lines than the pattern of the magnetic field lines of the first region of the magnetic-field-generating device (831), ii) a step c1) of exposing the coating layer (820) to the magnetic field of the second region of the single static magnetic-field-generating device (831) and, preferably partially simultaneously with said step c1), a step c2) of at least partially curing the one or more second areas (A2) of the coating layer (820) with a second actinic radiation LED source (841-2) comprising the two dimensional array of individually addressable actinic radiation emitters described herein, wherein the individually addressable actinic radiation emitters of the actinic radiation LED source (841-1) are switched on according to a first pattern during step b2) and wherein the individually addressable actinic radiation emitters of the actinic radiation LED source (841-2) are switched on according to a second pattern during step c2), said first and second patterns being different from each other. Instead of using the two actinic radiation LED sources (841-1, 841-2), a single one may be used provided that said single actinic radiation LED source has a sufficient width. Alternatively, the step c2) may be carried out by switching on all individually addressable actinic radiation emitters of the actinic radiation LED source (841) at the same time to cure the second areas (A2) and to cure the whole coating layer (820).

As shown in FIG. 8A3 and provided that the second actinic radiation LED source (841-2) used during step c2) does not at least partially cure the whole surface of the coating layer (820) such that one or more $n^{th}$ (third, fourth, etc.) areas (A3) of the coating layer (820) are not exposed to irradiation and are not at least partially cured, the process described herein may further comprise, after having moved the substrate (810) carrying the coating layer (820) to a $n^{th}$ (third, fourth, etc.) region of the single static magnetic-field-generating device (831) having a different pattern of magnetic field lines than the pattern of magnetic field lines of the first and second regions of the magnetic-field-generating device (831), n steps of dl) exposing the coating layer (820) to the magnetic field of a $n^{th}$ (third, fourth, etc.) region of the single static magnetic-field-generating device (831) and, preferably partially simultaneously with said step d1), a step d2) of at least partially curing the one or more $n^{th}$ (third, fourth, etc.) areas (A3) of the coating layer (820) with either a $n^{th}$ (third, fourth, etc.) actinic radiation LED source (841-3) comprising the two dimensional array of individually addressable actinic radiation emitters, wherein the individually addressable actinic radiation emitters of the first actinic radiation LED source (841-1) are switched on according to a first pattern during step b2), wherein the individually addressable actinic radiation emitters of the second actinic radiation LED source (841-2) are switched on according to a second pattern during step c2) and wherein the individually addressable actinic radiation emitters of the $n^{th}$ (third, fourth, etc.) actinic radiation LED source (841-3) are switched on according to a $n^{th}$ (third, fourth, etc.) pattern during step d2) said first, second and $n^{th}$ patterns being different from each other's (see FIG. 8A3 left) or with a standard radiation source being not-addressable (860) (see FIG. 8A3 right). Alternatively, the step d2) may be carried out by switching on all individually addressable actinic radiation emitters of the actinic radiation LED source (841-3) at the same time to cure the one or more $n^{th}$ (third, fourth, etc.) areas (A3) and to cure the whole coating layer (820). Instead of exposing the coating layer (820) to the magnetic field of the $n^{th}$ (third, fourth, etc.) region of the single static magnetic-field-generating device (831), said coating layer (820) may be exposed to a magnetic-field-generating device being different from the single static magnetic-field-generating device (831).

According to another embodiment and as described herein, the substrate (x10) carrying the coating layer (x20) described herein is in motion with respect to the actinic radiation LED source (x41) and when exposed to the irradiation of the actinic radiation LED source (x41) during step b2) and optionally during step c2). The selective irradiation is carried out with the actinic radiation LED source (x41) comprising the linear array of individually addressable actinic radiation emitters or the two dimensional array of individually addressable actinic radiation emitters.

For processes using linear arrays of individually addressable actinic radiation emitters, said emitters are switched on and off in a time-dependent manner according to one or more first patterns, preferably one or more bitmap patterns, having the same shape as the one or more first areas of the coating layer (x20) to be at least partially cured with said LED source (x41) while the substrate (x10) carrying the coating layer (x20) is moving.

For processes using two dimensional arrays of individually addressable actinic radiation emitters, said emitters may be are switched on and off in a time-dependent manner according to one or more first patterns, preferably one or more bitmap patterns having the same shape as the one or more first areas of the coating layer (x20) to be at least partially cured with said LED source (x41). In some embodiments using two dimensional arrays of individually addressable actinic radiation emitters and wherein the substrate (x10) carrying the coating layer (x20) is moving, the actinic radiation is projecting onto the substrate (x10) carrying the coating layer (x20) in such a way that the one or more projected images synchronously follows the moving substrate (x10). In other words, the individually addressable actinic radiation emitters of the two dimensional array corresponding to the one or more patterns, preferably one or more bitmap patterns, may be switched on and off in such a way that the projected image synchronously follows the moving substrate (x10), thus increasing the irradiation time and enhancing the curing efficiency. Alternatively, said emitters may be switched on all at once during a very short period of time (flash curing).

Examples of processes of this embodiment, wherein the magnetic-field-generating devices (x31, x32) are not in motion, i.e. are static, with respect to the actinic radiation LED source (x41), are shown in FIGS. 5, 9 and 10. Examples of processes of this embodiment, wherein the magnetic-field-generating devices (x31, x32) are in motion, with respect to the actinic radiation LED source (x41) are shown in FIGS. 6, 11 and 12, wherein said magnetic-field-generating devices (x31, x32) are preferably mounted on a transferring device such as a rotating cylinder or a belt. In FIGS. 5, 6, 9, 10, 11 and 12, the substrates (x10) carrying the coating layer (x20) and being in motion are represented with a star on their right.

According to one embodiment shown in FIG. 5A1, the steps b) and c) of the process described herein are carried out in a partially dynamic manner, wherein the substrate (510) carrying the coating layer (520) is in continuous motion during steps b1) and b2) and step c), wherein the radiation sources (541, 560) are not in motion (i.e. are static) and wherein a first magnetic-field-generating devices (531) is not in motion (i.e. is static) with respect to the actinic radiation LED source (541). As shown in FIG. 5A1, the process described herein comprises, while the substrate (510) carrying the coating layer (520) is continuously moving in the vicinity of, in particular onto, a first static magnetic-field-generating device (531), i) a step b1) of exposing said coating layer (520) to the magnetic field of said first static magnetic-field-generating device (531) such as those described herein, and, preferably partially simultaneously with said step b1), a step b2) of at least partially curing one or more first areas (A1) of the coating layer (520) with the actinic radiation LED source (541) comprising either the linear array of individually addressable actinic radiation emitters described herein or comprising the two dimensional array of individually addressable actinic radiation emitters described herein so as to form at least partially cured one or more first areas (A1) of the coating layer (520) while one or more second areas (A2) of the coating layer (520) are not yet at least partially cured; and, a step c) of at least partially curing the one or more second areas (A2) of the coating layer (520) with a standard radiation source being not-addressable (560), wherein the individually addressable actinic radiation emitters of the linear array of the actinic radiation LED source (541) are switched on and off in a time-dependent manner according to a first pattern while the substrate (510) carrying the coating layer (520) is moving along the first magnetic-field-generating device (531), or wherein the individually addressable actinic radiation emitters of the two dimensional array of the actinic radiation LED source (541) are switched on and off in a time-dependent manner according to a first pattern while the substrate (510) carrying the coating layer (520) is moving along the first magnetic-field-generating device (531), or wherein the individually addressable actinic radiation emitters of the two dimensional array of the actinic radiation LED source (541) corresponding to the first pattern are switched on all at once during a very short period of time (flash curing).

According to one embodiment shown in FIG. 5A2, the steps b) and c) of the process described herein are carried out in a partially dynamic manner, wherein the substrate (510) carrying the coating layer (520) is in continuous motion during steps b1) and b2) and step c1), wherein two actinic radiation LED sources (541-1, 541-2) are not in motion (i.e.

are static) and wherein a first magnetic-field-generating devices (531) are not in motion (i.e. are static) with respect to the actinic radiation LED source (541). As shown in FIG. 5A2, the process described herein comprises, while the substrate (510) carrying the coating layer (520) is continuously moving in the vicinity of, in particular onto, a first static magnetic-field-generating device (531), i) a step b1) of exposing said coating layer (520) to the magnetic field of said first static magnetic-field-generating device (531) such as those described herein, and, preferably partially simultaneously with said step b1), a step b2) of at least partially curing one or more first areas (A1) of the coating layer (520) with the actinic radiation LED source (541-1) comprising either the linear array of individually addressable actinic radiation emitters described herein or comprising the two dimensional array of individually addressable actinic radiation emitters described herein so as to form at least partially cured one or more first areas (A1) of the coating layer (520) while one or more second areas (A2) of the coating layer (520) are not yet at least partially cured; and, a step c) of at least partially curing the one or more second areas (A2) of the coating layer (520) with the actinic radiation LED source (541-2) comprising either the linear array of individually addressable actinic radiation emitters described herein or comprising the two dimensional array of individually addressable actinic radiation emitters described herein, wherein the individually addressable actinic radiation emitters of the linear array of the actinic radiation LED source (541-1) or of the two dimensional array are switched on and off in a time-dependent manner according to a first pattern while the substrate (510) carrying the coating layer (520) is moving along the first magnetic-field-generating device (531) or wherein the individually addressable actinic radiation emitters of the two dimensional array of the actinic radiation LED source (541-1) are switched on all at once according to a first pattern during a very short period of time (flash curing), wherein the individually addressable actinic radiation emitters of the linear array of the actinic radiation LED source (541-2) are switched on and off in a time-dependent manner according to a second pattern while the substrate (510) carrying the coating layer (520) is moving or wherein the individually addressable actinic radiation emitters of the two dimensional array of the actinic radiation LED source (541-2) corresponding to the second pattern are switched on all at once during a very short period of time (flash curing).

According to one embodiment shown in FIG. 9A1, the steps b) and c) of the process described herein are carried out in a partially dynamic manner, wherein the substrate (910) carrying the coating layer (920) is in continuous motion during steps b1) and b2) and steps c1) and c2), wherein the radiation sources (941, 960) are not in motion (i.e. are static) and wherein a first and second magnetic-field-generating devices (931, 932) are not in motion (i.e. are static) with respect to the actinic radiation LED source (941). As shown in FIG. 9A1, the process described herein comprises, while the substrate (910) carrying the coating layer (920) is continuously moving in the vicinity of, in particular onto, a first static magnetic-field-generating device (931), i) a step b1) of exposing said coating layer (920) to the magnetic field of said first static magnetic-field-generating device (931) such as those described herein, and, preferably partially simultaneously with said step b1), a step b2) of at least partially curing one or more first areas (A1) of the coating layer (920) with the actinic radiation LED source (941) comprising either the linear array of individually addressable actinic radiation emitters described herein or comprising the two dimensional array of individually addressable actinic radiation emitters described herein so as to form at least partially cured one or more first areas (A1) of the coating layer (920) while one or more second areas (A2) of the coating layer (920) are not yet at least partially cured; and, while the substrate (910) carrying the coating layer (920) is continuously moving in the vicinity of, in particular onto, a second static magnetic-field-generating device (932) such as those described herein and having a pattern of magnetic field lines which is different from the pattern of magnetic field lines of the first magnetic-field-generating device (931), ii) a step c1) of exposing said coating layer (920) to the magnetic field of said second static magnetic-field-generating device (932) and, preferably partially simultaneously with said step c1), a step c2) of at least partially curing the one or more second areas (A2) of the coating layer (920) with a standard radiation source being not-addressable (960), wherein the individually addressable actinic radiation emitters of the linear array of the actinic radiation LED source (941) are switched on and off in a time-dependent manner according to a first pattern while the substrate (910) carrying the coating layer (920) is moving along the first magnetic-field-generating device (931), or wherein the individually addressable actinic radiation emitters of the two dimensional array of the actinic radiation LED source (941) are switched on and off in a time-dependent manner according to a first pattern while the substrate (910) carrying the coating layer (920) is moving along the first magnetic-field-generating device (931), or wherein the individually addressable actinic radiation emitters of the two dimensional array of the actinic radiation LED source (941) corresponding to the first pattern are switched on all at once during a very short period of time (flash curing).

According to one embodiment shown in FIG. 9A2-3, the steps b) and c) of the process described herein are carried out in a partially dynamic manner, wherein the substrate (910) carrying the coating layer (920) is in continuous motion during steps b1) and b2) and steps c1) and c2), wherein two actinic radiation LED sources (941-1, 941-2) are not in motion (i.e. are static) and wherein a first and second magnetic-field-generating devices (931, 932) are not in motion (i.e. are static) with respect to the actinic radiation LED sources. As shown in FIG. 9A2, the process described herein comprises, while the substrate (910) carrying the coating layer (920) is continuously moving in the vicinity of, in particular onto, a first static magnetic-field-generating device (931), i) a step b1) of exposing said coating layer (920) to the magnetic field of said first static magnetic-field-generating device (931) such as those described herein, and, preferably partially simultaneously with said step b1), a step b2) of at least partially curing one or more first areas (A1) of the coating layer (920) with the actinic radiation LED source (941-1) comprising either the linear array of individually addressable actinic radiation emitters described herein or comprising the two dimensional array of individually addressable actinic radiation emitters described herein so as to form at least partially cured one or more first areas (A1) of the coating layer (920) while one or more second areas (A2) of the coating layer (920) are not yet at least partially cured; and, after having moved the substrate (910) carrying the coating layer (920) in the vicinity of, in particular onto, a second static magnetic-field-generating device (932) such as those described herein, said second magnetic-field-generating device (932) having a pattern of magnetic field lines which is different from the pattern of magnetic field lines of the first magnetic-field-generating device (931), ii) a step c1) of exposing said coating layer (920) to the magnetic field of said second static magnetic-field-generating device (932) and, preferably at least partially simultaneously with said step c1), a step c2) of at least partially curing the one or more second areas (A2) of the coating layer (920) with the actinic radiation LED source (941-2) comprising either the linear array of individually addressable actinic radiation emitters described herein or comprising the two dimensional array of individually addressable actinic radiation emitters described herein, wherein the individually addressable actinic radiation emitters of the linear array of the actinic radiation LED source (941-1) or of the two dimensional array are switched on and off in a time-dependent manner according to a first pattern while the substrate (910) carrying the coating layer (920) is moving along the first magnetic-field-generating device (931) or wherein the individually addressable actinic radiation emitters of the two dimensional array of the actinic radiation LED source (941-1) are switched all at once during a very short period of time according to a first pattern while the substrate (910) carrying the coating layer (920) is moving along the first magnetic-field-generating device (931), wherein the individually addressable actinic radiation emitters of the linear array of the actinic radiation LED source (941-2) or of the two dimensional array are switched on and off in a time-dependent manner according to a second pattern while the substrate (910) carrying the coating layer (920) is moving along the second magnetic-field-generating device (932) or wherein the individually addressable actinic radiation emitters of the two dimensional array of the actinic radiation LED source (941-2) are switched on all at once during a very short period of time according to a second pattern while the substrate (910) carrying the coating layer (920) is moving along the second magnetic-field-generating device (932).

As shown in FIG. 9A3 and provided that the actinic radiation LED source (941-2) used during step c2) does not at least partially cure the whole surface of the coating layer (920) such that $n^{th}$ (third, fourth, etc.) areas (A3) of the coating layer (920) are not exposed to irradiation and are not at least partially cured, the process described herein may further comprise, after having moved the substrate (910) carrying the coating layer (920) onto a $n^{th}$ (third, fourth, etc.) static magnetic-field-generating device (933) such as those described herein, n steps of dl) exposing the coating layer (920) to the magnetic field of a $n^{th}$ static magnetic-field-generating device (933) and, preferably partially simultaneously with said step d1), a step d2) of at least partially curing the one or more $n^{th}$ (third, fourth, etc.) areas (A3) of the coating layer (920) with either an actinic radiation LED source (941-3) comprising either the linear array of individually addressable actinic radiation emitters described herein or comprising the two dimensional array of individually addressable actinic radiation emitters described herein or with a standard radiation source being not-addressable (960). Alternatively, the step d2) may be carried out by switching on all individually addressable actinic radiation emitters of the actinic radiation LED source (941-3) at the same time to cure the one or more $n^{th}$ (third, fourth, etc.) areas (A3) and to cure the whole coating layer (920).

According to one embodiment shown in FIG. 10A1, the steps b) and c) of the process described herein are carried out in a partially dynamic manner, wherein the substrate (1010) carrying the coating layer (1(20) is in continuous motion during steps b1) and b2) and steps c1) and c2), wherein the radiation sources (1041, 1060) are not in motion (i.e. are static), and wherein a single static magnetic-field-generating device (1031) is used during step b1) and c1), said single static magnetic-field-generating device (1031) being not in motion (i.e. is static) with respect to the actinic radiation LED source (1041) and wherein the substrate (1010) carrying the coating layer (1020) is continuously moving in the vicinity of, in particular onto, different regions of the single static magnetic-field-generating device (1031) instead of using different first and second magnetic-field-generating devices. As shown in FIG. 10A1, the process described herein comprises, while the substrate 10) carrying the coating layer (1020) is continuously moving in the vicinity of, in particular onto, a first region of the single static magnetic-field-generating device (1031), i) a step b1) of exposing said coating layer (1020) to the magnetic field of said first region of the single static magnetic-field-generating device (1031) such as those described herein, and, preferably partially simultaneously with said step b1), a step b2) of at least partially curing one or more first areas (A1) of the coating layer (1020) with the actinic radiation LED source (1041) comprising either the linear array of individually addressable actinic radiation emitters described herein or comprising the two dimensional array of individually addressable actinic radiation emitters described herein so as to form at least partially cured one or more first areas (A1) of the coating layer (1020) while one or more second areas (A2) of the coating layer (1020) are not yet at least partially cured; and, while the substrate (1010) carrying the coating layer (1020) is continuously moving in the vicinity of, in particular onto, a second region of the single static magnetic-field-generating device (1031) having a different pattern of magnetic field lines than the pattern of magnetic field lines of the first region of the single static magnetic-field-generating device (1031), ii) a step c1) of exposing the coating layer (1020) to the magnetic field of said single static magnetic-field-generating device (1031) and, preferably partially simultaneously with said step c1), a step c2) of at least partially curing the one or more second areas (A2) of the coating layer (1020) with a standard radiation source being not-addressable (1060), wherein the individually addressable actinic radiation emitters of the linear array of the actinic radiation LED source (1041) are switched on and off in a time-dependent manner according to a first pattern while the substrate (1010) carrying the coating layer (1020) is moving along the first region of the single static magnetic-field-generating device (1031) or wherein the individually addressable actinic radiation emitters of the two dimensional array of the actinic radiation LED source (1041) are switched on and off in a time-dependent manner according to a first pattern while the substrate (1010) carrying the coating layer (1020) is moving along the first region of the single static magnetic-field-generating device (1031), or wherein the individually addressable actinic radiation emitters of the two dimensional array of the actinic radiation LED source (1041) corresponding to the first pattern are switched on all at once during a very short period of time (flash curing).

According to one embodiment shown in FIG. 10A2-3, the steps b) and c) of the process described herein are carried out in a partially dynamic manner, wherein the substrate (1010) carrying the coating layer (1020) is in continuous motion during steps b1) and b2) and steps c1) and c2), wherein two actinic radiation LED sources (1041-1, 1041-2) are not in motion (i.e. are static), and wherein a single static magnetic-field-generating device (1031) is used during step b1) and c1), said magnetic-field-generating devices (1031) being not in motion (i.e. is static) with respect to the actinic radiation LED sources and wherein the substrate (1010) carrying the coating layer (1020) is continuously moving in the vicinity of, in particular onto, different regions of the single static magnetic-field-generating device (1031) instead of using different first and second magnetic-field-generating devices. As shown in FIG. 10A2, the process described herein comprises, while the substrate (1010) carrying the coating layer (1020) is continuously moving in the vicinity of, in particular onto, a first region of the single static magnetic-field-generating device (1031) i) a step b1) of exposing said coating layer (1020) to the magnetic field of said first region of the single static magnetic-field-generating device (1031) such as those described herein, and, preferably partially simultaneously with said step b1), a step b2) of at least partially curing one or more first areas (A1) of the coating layer (1020) with the actinic radiation LED source (1041-1) comprising either the linear array of individually addressable actinic radiation emitters described herein or comprising the two dimensional array of individually addressable actinic radiation emitters described herein so as to form at least partially cured one or more first areas (A1) of the coating layer (1020) while one or more second areas (A2) of the coating layer (1020) are not yet at least partially cured; and, while the substrate (1010) carrying the coating layer (1020) is continuously moving in the vicinity of, in particular onto, a second region of the single static magnetic-field-generating device (1031) having a different pattern of magnetic field lines than the pattern of magnetic field lines of the first region of the single static magnetic-field-generating device (1031), ii) a step c1) of exposing the coating layer (1020) to the magnetic field of the second region of the single static magnetic-field-generating device (1031) and, preferably partially simultaneously with said step c1), a step c2) of at least partially curing the one or more second areas (A2) of the coating layer (1020) with the actinic radiation LED source (1041-2) comprising either the linear array of individually addressable actinic radiation emitters described herein or comprising the two dimensional array of individually addressable actinic radiation emitters described herein, wherein the individually addressable actinic radiation emitters of the linear array of the actinic radiation LED source (1041-1) are switched on and off in a time-dependent manner according to a first pattern while the substrate (1010) carrying the coating layer (1020) is moving along the first region of the magnetic-field-generating device (1031) or wherein the individually addressable actinic radiation emitters of the two dimensional array of the actinic radiation LED source (1041-1) are switched on and off in a time-dependent manner according to a first pattern while the substrate (1010) carrying the coating layer (1020) is moving along the first region of the single static magnetic-field-generating device (1031), or wherein the individually addressable actinic radiation emitters of the two dimensional array of the actinic radiation LED source (1041-1) corresponding to the first pattern are switched on all at once during a very short period of time (flash curing), wherein the individually addressable actinic radiation emitters of the linear array of the actinic radiation LED source (1041-2) are switched on and off in a time-dependent manner according to a second pattern while the substrate (1010) carrying the coating layer (1020) is moving along the second region of the magnetic-field-generating device (1032), or wherein the individually addressable actinic radiation emitters of the two dimensional array of the actinic radiation LED source (1041-2) are switched on and off in a time-dependent manner according to a second pattern while the substrate (1010) carrying the coating layer (1020) is moving along the second region of the magnetic-field-generating device (1032), or wherein the individually addressable actinic radiation emitters of the two dimensional array of the actinic radiation LED source (1041-2) corresponding to the second pattern are switched on all at once during a very short period of time (flash curing).

As shown in FIG. 10A3 and provided that the actinic radiation LED source (1041-2) used during step c2) does not at least partially cure the whole surface of the coating layer (1020) such that one or more $n^{th}$ (third, fourth, etc.) areas (A3) of the coating layer (1020) are not exposed to irradiation and at least partial curing, the process described herein may further comprise n steps of, while the substrate (1010) carrying the coating layer (1020) is moving in the vicinity of, in particular onto, a $n^{th}$ (third, fourth, etc.) region of the single static magnetic-field-generating device (1031), i) a step d1) of exposing the coating layer (1020) to the magnetic field of the $n^{th}$ (third, fourth, etc.) region of the single static magnetic-field-generating device (1031) and, preferably partially simultaneously with said step d1), a step d2) of at least partially curing the one or more $n^{th}$ (third, fourth, etc.) areas (A3) of the coating layer (1020) with either an actinic radiation LED source (1041-3) comprising either the linear array of individually addressable actinic radiation emitters described herein or comprising the two dimensional array of individually addressable actinic radiation emitters described herein or with a standard radiation source being not-addressable (1060). Alternatively, the step d2) may be carried out by switching on all individually addressable actinic radiation emitters of the actinic radiation LED source (1041-3) at the same time to cure the one or more $n^{th}$ (third, fourth, etc.) areas (A3) and to cure the whole coating layer (1020). Instead of exposing the coating layer (1020) to the magnetic field of the $n^{th}$ (third, fourth, etc.) region of the single static magnetic-field-generating device (1031), said coating layer (1020) may be exposed to a magnetic-field-generating device being different from the single static magnetic-field-generating device (1031).

According to one embodiment shown in FIG. 6A1, the steps b) and c) of the process described herein are carried out in a dynamic manner, wherein the substrate (610) carrying the coating layer (620) is in continuous motion during steps b1) and b2) and step c), wherein the radiation sources (641, 660) are not in motion (i.e. are static), and wherein a first magnetic-field-generating device (631) is in motion preferably at the same speed as the coating layer (620). As shown in FIG. 6A1, the process described herein comprises, while the substrate (610) carrying the coating layer (620) is concomitantly moving with the first magnetic-field-generating device (631), i) a step b1) of exposing said coating layer (620) to the magnetic field of said first magnetic-field-generating device (631) such as those described herein, and, preferably partially simultaneously with said step b1), a step b2) of at least partially curing one or more first areas (A1) of the coating layer (620) with the actinic radiation LED source (641) comprising either the linear array of individually addressable actinic radiation emitters described herein or comprising the two dimensional array of individually addressable actinic radiation emitters described herein so as to form at least partially cured one or more first areas (A1) of the coating layer (620) while one or more second areas (A2) of the coating layer (620) are not yet at least partially cured; and a step c) of at least partially curing the one or more second areas (A2) of the coating layer (620) with a standard radiation source being not-addressable (660), wherein the individually addressable actinic radiation emitters of the linear array of the actinic radiation LED source (641) are switched on and off in a time-dependent manner according to a first pattern while the substrate (610) carrying the coating layer (620) is concomitantly moving with the first magnetic-field-generating device (631) or wherein the individually addressable actinic radiation emitters of the two dimensional array of the actinic radiation LED source (641) are switched on and off in a time-dependent manner according to a first pattern while the substrate (610) carrying the coating layer (620) is concomitantly moving with the first magnetic-field-generating device (631), or wherein the individually addressable actinic radiation emitters of the two dimensional array of the actinic radiation LED source (641) corresponding to the first pattern are switched on all at once during a very short period of time (flash curing).

According to one embodiment shown in FIG. 6A2, the steps b) and c) of the process described herein are carried out in a dynamic manner, wherein the substrate (610) carrying the coating layer (620) is in continuous motion during steps b1) and b2) and step c), wherein the two actinic radiation LED sources (641-1, 641-2) are not in motion (i.e. are static), and wherein a first magnetic-field-generating device (631) is in motion preferably at the same speed as the coating layer (620). As shown in FIG. 6A2, the process described herein comprises, while the substrate (610) carrying the coating layer (620) is concomitantly moving with the first magnetic-field-generating device (631), i) a step b1) of exposing said coating layer (620) to the magnetic field of said first magnetic-field-generating device (631) such as those described herein, and, preferably partially simultaneously with said step b1), a step b2) of at least partially curing one or more first areas (A1) of the coating layer (620) with the actinic radiation LED source (641-1) comprising either the linear array of individually addressable actinic radiation emitters described herein or comprising the two dimensional array of individually addressable actinic radiation emitters described herein so as to form at least partially cured one or more first areas (A1) of the coating layer (620) while one or more second areas (A2) of the coating layer (620) are not yet at least partially cured; and, a step c) of at least partially curing the one or more second areas (A2) of the coating layer (620) with the actinic radiation LED source (641-2) comprising either the linear array of individually addressable actinic radiation emitters described herein or comprising the two dimensional array of individually addressable actinic radiation emitters described herein, wherein the individually addressable actinic radiation emitters of the linear array of the actinic radiation LED source (641-1) are switched on and off in a time-dependent manner according to a first pattern while the substrate (610) carrying the coating layer (620) is concomitantly moving with the first magnetic-field-generating device (631) or wherein the individually addressable actinic radiation emitters of the two dimensional array of the actinic radiation LED source (641-1) are switched on and off in a time-dependent manner according to a first pattern while the substrate (610) carrying the coating layer (620) is concomitantly moving with the first magnetic-field-generating device (631), or wherein the individually addressable actinic radiation emitters of the two dimensional array of the actinic radiation LED source (641-1) corresponding to the first pattern are switched on all at once during a very short period of time (flash curing), wherein the individually addressable actinic radiation emitters of the linear array of the actinic radiation LED source (641-2) are switched on and off in a time-dependent manner according to a second pattern while the substrate (610) carrying the coating layer (620) is moving or wherein the individually addressable actinic radiation emitters of the two dimensional array of the actinic radiation LED source (641-2) corresponding to the second pattern are switched on all at once during a very short period of time (flash curing).

According to one embodiment shown in FIG. 11A1, the steps b) and c) of the process described herein are carried out in a partially dynamic manner, wherein the substrate (1110) carrying the coating layer (1120) is in continuous motion during steps b1) and b2) and steps c1) and c2), wherein the radiation sources (1141, 1160) are not in motion (i.e. are static), wherein a first magnetic-field-generating device (831) is in motion preferably at the same speed as the coating layer (1120) and wherein a second magnetic-field-generating device (1132) is not in motion (i.e. is static) with respect to the radiation source (1160). As shown in FIG. 11A1, the process described herein comprises, while the substrate (1110) carrying the coating layer (1120) is concomitantly moving with the first magnetic-field-generating device (1131), i) a step b1) of exposing said coating layer (1120) to the magnetic field of said first magnetic-field-generating device (1131) such as those described herein, and, preferably partially simultaneously with said step b1), a step b2) of at least partially curing one or more first areas (A1) of the coating layer (1120) with the actinic radiation LED source (1141) comprising either the linear array of individually addressable actinic radiation emitters described herein or comprising the two dimensional array of individually addressable actinic radiation emitters described herein so as to form at least partially cured one or more first areas (A1) of the coating layer (1120) while one or more second areas (A2) of the coating layer (1120) are not yet at least partially cured; and, while the substrate (1110) carrying the coating layer (1120) is continuously moving in the vicinity of, in particular onto, a second static magnetic-field-generating device (1132) such as those described herein, ii) a step c1) of exposing said coating layer (1120) to the magnetic field of said second magnetic-field-generating device (1132) and, preferably partially simultaneously with said step c1), a step c2) of at least partially curing the one or more second areas (A2) of the coating layer (1120) with a standard radiation source being not-addressable (1160), wherein the individually addressable actinic radiation emitters of the linear array of the actinic radiation LED source (1141) are switched on and off in a time-dependent manner according to a first pattern while the substrate (1110) carrying the coating layer (1120) is concomitantly moving with the first magnetic-field-generating device (1131) or wherein the individually addressable actinic radiation emitters of the two dimensional array of the actinic radiation LED source (1141) are switched on and off in a time-dependent manner according to a first pattern while the substrate (1110) carrying the coating layer (1120) is concomitantly moving with the first magnetic-field-generating device (1131), or wherein the individually addressable actinic radiation emitters of the two dimensional array of the actinic radiation LED source (1141) corresponding to the first pattern are switched on all at once during a very short period of time (flash curing). Instead of using the first magnetic-field-generating device (1131) being in motion and the second magnetic-field-generating device (1132) being not in motion (i.e. being static) with respect to the radiation source (1160) as shown in FIG. 11A1-A3, the process described herein may use a first magnetic-field-generating device (1131) being not in motion (i.e. being static) and a second magnetic-field-generating device (1132) being in motion with respect to the radiation source (not shown in FIG. 11A1-3).

According to one embodiment shown in FIG. 11A2-3, the steps b) and c) of the process described herein are carried out in a partially dynamic manner, wherein the substrate (1110)

carrying the coating layer (1120) is in continuous motion during steps b1) and b2) and steps c1) and c2), wherein the two actinic radiation LED sources (1141-1, 1141-2) are not in motion (i.e. are static), wherein a first magnetic-field-generating device (1131) is in motion preferably at the same speed as the coating layer (1120) and wherein a second magnetic-field-generating device (1132) is not in motion (i.e. is static) with respect to the radiation source (1141-2). As shown in FIG. 11A2, the process described herein comprises, while the substrate (1110) carrying the coating layer (1120) is concomitantly moving with the first magnetic-field-generating device (1131), i) a step b1) of exposing said coating layer (1120) to the magnetic field of said first magnetic-field-generating device (1131) such as those described herein, and, preferably partially simultaneously with said step b1), a step b2) of at least partially curing one or more first areas (A1) of the coating layer (1120) with the actinic radiation LED source (1141-1) comprising either the linear array of individually addressable actinic radiation emitters described herein or comprising the two dimensional array of individually addressable actinic radiation emitters described herein so as to form at least partially cured one or more first areas (A1) of the coating layer (1120) while one or more second areas (A2) of the coating layer (1120) are not yet at least partially cured; and, while the substrate (1110) carrying the coating layer (1120) is continuously moving in the vicinity of, in particular onto, a second static magnetic-field-generating device (1132) such as those described herein, ii) a step c1) of exposing said coating layer (1120) to the magnetic field of said second magnetic-field-generating device (1132) and, preferably partially simultaneously with said step c1), a step c2) of at least partially curing the one or more second areas (A2) of the coating layer (1120) with the actinic radiation LED source (1141-2) comprising either the linear array of individually addressable actinic radiation emitters described herein or comprising the two dimensional array of individually addressable actinic radiation emitters described herein, wherein the individually addressable actinic radiation emitters of the linear array of the actinic radiation LED source (1141-1) are switched on and off in a time-dependent manner according to a first pattern while the substrate (1110) carrying the coating layer (1120) is concomitantly moving with the first magnetic-field-generating device (1131) or wherein the individually addressable actinic radiation emitters of the two dimensional array of the actinic radiation LED source (1141-1) are switched on and off in a time-dependent manner according to a first pattern while the substrate (1110) carrying the coating layer (1120) is concomitantly moving with the first magnetic-field-generating device (1131), or wherein the individually addressable actinic radiation emitters of the two dimensional array of the actinic radiation LED source (1141-1) are switched corresponding to the first pattern on all at once during a very short period of time (flash curing), wherein the individually addressable actinic radiation emitters of the linear array of the actinic radiation LED source (1141-2) are switched on and off in a time-dependent manner according to a second pattern while the substrate (1110) carrying the coating layer (1120) is moving in the vicinity of, in particular onto, the second magnetic-field-generating device (1132), or wherein the individually addressable actinic radiation emitters of the two dimensional array of the actinic radiation LED source (1141-2) are switched on and off in a time-dependent manner according to a second pattern while the substrate (1110) carrying the coating layer (1120) is moving in the vicinity of, in particular onto, the second magnetic-field-generating device (1132), or wherein the individually addressable actinic radiation emitters of the two dimensional array of the actinic radiation LED source (1141-2) corresponding to the second pattern are switched on all at once during a very short period of time (flash curing).

As shown in FIG. 11A3 and provided that the actinic radiation LED source (1141-2) used during step c2) does not at least partially cure the whole surface of the coating layer (1120) such that one or more $n^{th}$ (third, fourth, etc.) areas (A3) of the coating layer (1120) are not exposed to irradiation and at least partial curing, the process described herein may further comprise n steps of, while the substrate (1110) carrying the coating layer (1120) is moving in the vicinity of, in particular onto, a $n^{th}$ (third, fourth, etc.) magnetic-field-generating device (1133), i) a step d1) of exposing the coating layer (1120) to the magnetic field of a $n^{th}$ (third, fourth, etc.) magnetic-field-generating device (1133) and, preferably partially simultaneously with said step d1), a step d2) of at least partially curing the one or more $n^{th}$ (third, fourth, etc.) areas (A3) of the coating layer (1120) with either an actinic radiation LED source (1141-3) comprising either the linear array of individually addressable actinic radiation emitters described herein or comprising the two dimensional array of individually addressable actinic radiation emitters described herein or with a standard radiation source being not-addressable (1160).

According to one embodiment shown in FIG. 12A1, the steps b) and c) of the process described herein are carried out in a dynamic manner, wherein the substrate (1210) carrying the coating layer (1220) is in continuous motion during steps b1) and b2) and steps c1) and c2), wherein the radiation sources (1241, 1260) are not in motion (i.e. are static), wherein a first and second magnetic-field-generating devices (1231, 1232) are in motion preferably at the same speed as the substrate (1210) carrying the coating layer (1220). As shown in FIG. 12A1, the process described herein comprises, while the substrate (1210) carrying the coating layer (1220) is concomitantly moving with the first magnetic-field-generating device (1231), the process described herein comprises, while the substrate (1210) carrying the coating layer (1220) is concomitantly moving with the first magnetic-field-generating device (1231), i) a step b1) of exposing said coating layer (1220) to the magnetic field of said first magnetic-field-generating device (1231) such as those described herein, and, preferably partially simultaneously with said step b1), a step b2) of at least partially curing one or more first areas (A1) of the coating layer (1220) with the actinic radiation LED source (1241) comprising either the linear array of individually addressable actinic radiation emitters described herein or comprising the two dimensional array of individually addressable actinic radiation emitters described herein so as to form at least partially cured one or more first areas (A1) of the coating layer (1220) while one or more second areas (A2) of the coating layer (1220) are not yet at least partially cured; and, while the substrate (1210) carrying the coating layer (1220) is concomitantly moving with a second magnetic-field-generating device (1232) such as those described herein, ii) a step c1) of exposing said coating layer (1220) to the magnetic field of said second magnetic-field-generating device (1232) having a pattern of magnetic field lines which is different from the pattern of magnetic field lines of the first magnetic-field-generating device (1231), and, preferably partially simultaneously with said step c1), a step c2) of at least partially curing the one or more second areas (A2) of the coating layer (1220) with a standard radiation source being not-addressable (1260), wherein the individually addressable actinic radiation emitters of the linear array of the actinic radiation LED source (1241) are switched on and off in a time-dependent manner according to a first pattern while the substrate (1210) carrying the coating layer (1220) is concomitantly moving with the first magnetic-field-generating device (1231) or wherein the individually addressable actinic radiation emitters of the two dimensional array of the actinic radiation LED source (1241) are switched on and off in a time-dependent manner according to a first pattern while the substrate (1210) carrying the coating layer (1220) is concomitantly moving with the first magnetic-field-generating device (1231) or wherein the individually addressable actinic radiation emitters of the two dimensional array of the actinic radiation LED source (1241) corresponding to the first pattern are switched on all at once during a very short period of time (flash curing).

According to one embodiment shown in FIG. 12A2-3, the steps b) and c) of the process described herein are carried out in a dynamic manner, wherein the substrate (1210) carrying the coating layer (1220) is in continuous motion during steps b1) and b2) and steps c1) and c2), wherein the actinic radiation LED source (1241-1, 1241-2) are not in motion (i.e. are static), wherein a first and second magnetic-field-generating devices (1231, 1232) are in motion preferably at the same speed as the substrate (1210) carrying the coating layer (1220). As shown in FIG. 12A1, the process described herein comprises, while the substrate (1210) carrying the coating layer (1220) is concomitantly moving with the first magnetic-field-generating device (1231), i) a step b1) of exposing said coating layer (1220) to the magnetic field of said first magnetic-field-generating device (1231) such as those described herein, and, preferably partially simultaneously with said step b1), a step b2) of at least partially curing one or more first areas (A1) of the coating layer (1220) with the actinic radiation LED source (1241-1) comprising either the linear array of individually addressable actinic radiation emitters described herein or comprising the two dimensional array of individually addressable actinic radiation emitters described herein so as to form at least partially cured one or more first areas (A1) of the coating layer (1220) while one or more second areas (A2) of the coating layer (1220) are not yet at least partially cured; and, while the substrate (1210) carrying the coating layer (1220) is concomitantly moving with a second static magnetic-field-generating device (1232) such as those described herein and having a pattern of magnetic field lines which is different from the pattern of magnetic field lines of the first magnetic-field-generating device (1231), ii) a step c1) of exposing said coating layer (1220) to the magnetic field of said second magnetic-field-generating device (1232) and, preferably partially simultaneously with said step c1), a step c2) of at least partially curing the one or more second areas (A2) of the coating layer (1220) with the actinic radiation LED source (1241-2) comprising either the linear array of individually addressable actinic radiation emitters described herein or comprising the two dimensional array of individually addressable actinic radiation emitters described herein, wherein the individually addressable actinic radiation emitters of the linear array of the actinic radiation LED source (1241-1) are switched on and off in a time-dependent manner according to a first pattern while the substrate (1210) carrying the coating layer (1220) is concomitantly moving with the first magnetic-field-generating device (1231) or wherein the individually addressable actinic radiation emitters of the two dimensional array of the actinic radiation LED source (1241-1) are switched on and off in a time-dependent manner according to a first pattern while the substrate (1210) carrying the coating layer (1220) is concomitantly moving with the first magnetic-field-generating device (1231), or wherein the individually addressable actinic radiation emitters of the two dimensional array of the actinic radiation LED source (1241-1) corresponding to the first pattern are switched on all at once during a very short period of time (flash curing), wherein the individually addressable actinic radiation emitters of the linear array of the actinic radiation LED source (1241-2) are switched on and off in a time-dependent manner according to a second pattern while the substrate (1210) carrying the coating layer (1220) is concomitantly moving with the second magnetic-field-generating device (1232) or wherein the individually addressable actinic radiation emitters of the two dimensional array of the actinic radiation LED source (1241-2) are switched on and off in a time-dependent manner according to a second pattern while the substrate (1210) carrying the coating layer (1220) is concomitantly moving with the second magnetic-field-generating device (1232) or wherein the individually addressable actinic radiation emitters of the two dimensional array of the actinic radiation LED source (1241-2) corresponding to the second pattern are switched on all at once during a very short period of time (flash curing). As shown in FIG. 12A3 and provided that the actinic radiation LED source (1241-2) used during step c2) does not at least partially cure the whole surface of the coating layer (1220) such that one or more $n^{th}$ (third, fourth, etc.) areas (A3) of the coating layer (1220) are not exposed to irradiation and at least partial curing, the process described herein may further comprise n steps of, while the substrate (1210) carrying the coating layer (1220) is concomitantly moving with a $n^{th}$ (third, fourth, etc.) magnetic-field-generating device (1233), i) a step d1) of exposing the coating layer (1220) to the magnetic field of said $n^{th}$ (third, fourth, etc.) magnetic-field-generating device (1233) and, preferably partially simultaneously with said step d1), a step d2) of at least partially curing the one or more $n^{th}$ (third, fourth, etc.) areas (A3) of the coating layer (1220) with either an actinic radiation LED source (1241-3) comprising either the linear array of individually addressable actinic radiation emitters described herein or comprising the two dimensional array of individually addressable actinic radiation emitters described herein or with a standard radiation source being not-addressable (1260).

The processes for producing the optical effect layers (OELs) described herein may further comprise a step of exposing the coating layer (x10) to a dynamic magnetic field of a device so as to bi-axially orient at least a part of the non-spherical magnetic or magnetizable pigment particles, preferably the platelet-shaped magnetic or magnetizable pigment particles, said step occurring prior to or simultaneously with step b1) and before step b2) and/or prior to or simultaneously with step c1) and before step c2). Processes comprising such a step of exposing a composition to a dynamic magnetic field of a magnetic device so as to bi-axially orient at least a part of the non-spherical magnetic or magnetizable pigment particles are disclosed in WO 2015/086257 A1. Carrying out a bi-axial orientation means that magnetic or magnetizable pigment particles are made to orient in such a way that their two main axes are constrained. That is, each non-spherical magnetic or magnetizable pigment particle, preferably platelet-shaped magnetic or magnetizable pigment particle, can be considered to have a major axis in the plane of the pigment particle and an orthogonal minor axis in the plane of the pigment particle. The major and minor axes of the magnetic or magnetizable pigment particles are each caused to orient according to the dynamic magnetic field. Effectively, this results in neighboring magnetic pigment particles that are close to each other in space to be essentially parallel to each other. In order to perform a bi-axial orientation, the non-spherical, preferably platelet-shaped, magnetic pigment particles must be subjected to a strongly time-dependent, direction-variable external magnetic field.

Particularly preferred devices for bi-axially orienting the non-spherical, preferably platelet-shaped, magnetic or magnetizable pigment particles are disclosed in EP 2 157 141 A1. The device disclosed in EP 2 157 141 A1 provides a dynamic magnetic field that changes its direction forcing the magnetic or magnetizable pigment particles to rapidly oscillate until both main axes, X-axis and Y-axis, become substantially parallel to the substrate surface, i.e. the magnetic or magnetizable pigment particles rotate until they come to the stable sheet-like formation with their X and Y axes substantially parallel to the substrate surface and are planarized in said two dimensions. Other particularly preferred devices for bi-axially orienting the non-spherical, preferably platelet-shaped, magnetic or magnetizable pigment particles comprise linear permanent magnet Halbach arrays, i.e. assemblies comprising a plurality of magnets with different magnetization directions. Detailed description of Halbach permanent magnets was given by Z. Q. Zhu and D. Howe (Halbach permanent magnet machines and applications: a review, IEE. Proc. Electric Power Appl., 2001, 148, p. 299-308). The magnetic field produced by such a Halbach array has the properties that it is concentrated on one side of the array while being weakened almost to zero on the other side. WO 2016/083259 A1 discloses suitable devices for bi-axially orienting magnetic or magnetizable pigment particles, wherein said devices comprise a Halbach cylinder assembly. Other particularly preferred devices for bi-axially orienting the non-spherical, preferably platelet-shaped, magnetic or magnetizable pigment particles are spinning magnets, said magnets comprising disc-shaped spinning magnets or magnetic assemblies that are essentially magnetized along their diameter. Suitable spinning magnets or magnetic assemblies are described in US 2007/0172261 A1, said spinning magnets or magnetic assemblies generate radially symmetrical time-variable magnetic fields, allowing the bi-orientation of magnetic or magnetizable pigment particles of a not yet cured or hardened coating composition. These magnets or magnetic assemblies are driven by a shaft (or spindle) connected to an external motor. CN 102529326 B discloses examples of devices comprising spinning magnets that might be suitable for bi-axially orienting magnetic or magnetizable pigment particles. In a preferred embodiment, suitable devices for bi-axially orienting non-spherical, preferably platelet-shaped, magnetic or magnetizable pigment particles are shaft-free disc-shaped spinning magnets or magnetic assemblies constrained in a housing made of non-magnetic, preferably non-conducting, materials and are driven by one or more magnet-wire coils wound around the housing. Examples of such shaft-free disc-shaped spinning magnets or magnetic assemblies are disclosed in WO 2015/082344 A1, WO 2016/026896 A1 and in WO 2018/141547 A1.

The actinic radiation LED source (x41) described herein comprises the array, in particular the linear or two dimensional array, of irradiation, preferably UV-Vis, emitters, in particular chips, on an Insulated Metal Substrate (IMS), wherein said source has a surface large enough to produce the required amount of radiation, in particular the required amount of UV radiation. Small-size high-power UV-LED chips are available, e.g. the ES-EESVF11M from EPISTAR, measuring 11×11 mil (280×280 □m), emission wavelength between 395 and 415 nm; radiant flux 28 mW at 20 mA; maximum rating 67 mW at 50 mA under efficient cooling. These chips can be assembled in the form of a linear array in Chip-on-Board (CoB) technology on an Insulated Metal Substrate (IMS), e.g. a copper-insulator-aluminum plate. IMS has the advantage to provide for a very efficient heat dissipation. The semiconductor chips are glued or directly soldered, preferably directly soldered, to the substrate by a robot, and then wire-bonded by the same robot to a pre-established conductor pattern on the substrate. CoB technology allows the highest component density to be achieved, because bare-chips are used, without any packaging overhead. The wire-bonding can be protected against mechanical damage by embedding into a polymer, in particular UV-transparent and lightfast silicone polymers.

For embodiments where irradiation with the actinic radiation LED source (x41) onto the coating layer (320) is carried out under size reduction, a linear 256-pixel array of ES-EESVF11M chips being about 75 mm (3 inch) long and being disposed in the object plane of a low-loss quartz projection optics is suitable. Preferably, the image of the pixel array is chosen to be about half its original linear size. For example, a size of the selectively curable area(s) measures 38×0.14 mm yields a resolution of 170 dots per inch at the fourfold illumination density. By reducing the image, a higher dpi resolution and a higher irradiation density is advantageously obtained.

Addressing/driving logic for individually switching on and off each of the emitters in the array is available, e.g. from Texas Instrument (see the TLC5925, TLC5926, or TLC5927 Serial-Input 16-Channel Constant-Current LED Sink Drivers). These chips allow to set the desired operating current of the actinic radiation LED source (x41) via a resistance of appropriate value. The drivers are preferably used in bare-chip version, such that the integration of the addressing logic into the array of the actinic radiation LED source (x41) can be done in CoB technology, too, by wire-bonding. 256 Pixels need altogether 16 of these driver circuits, plus a 4-bit-to-16 lines addressing decoder chip connected to the "enable" lines of the driver circuits.

Figure 13:
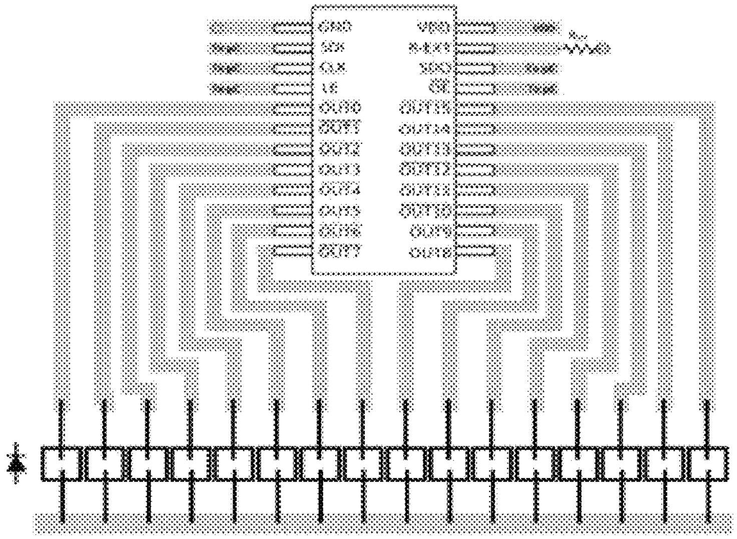
FIG. 13 schematically depicts how the driving logic chip may be connected to a linear array of 16 UV-LEDs by chip-on-board technology.
Figure 14:
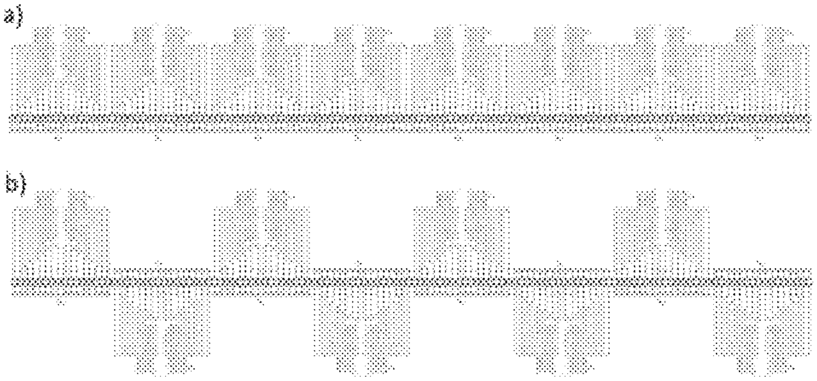
FIG. 14 schematically illustrates schematically depicts a first (FIG. 14*a*)) and a second (FIG. 14*b*)) optional arrangement of the combined driving logic chip/UV-LEDs of FIG. 13 to build a 128-pixel linear array.

The drivers of the emitters of the actinic radiation LED source (x41) are addressed by a serial data stream. FIG. 14 shows the logic diagram for the reading of the serial data. The data is clocked in (CLK) at a rate of 30 MHz, starting with the Most Significant Bit (Out15), and ending with the Least Significant Bit (Out0). After the data has been read in, the Latch Enable (LE) is clocked, which will store the last 16 bits in the chip. Upon setting the Output Enable low, the stored data is displayed, i.e. the corresponding diodes are switched on. In the shown example, Diodes no 0, 3, 4, 5, 10, 13, 15 are switched on. The addressing of multiple decoder units is done via the Latch Enable line, which is clocked individually for each decoder when the serial data stream has reached the position corresponding to the data to be displayed by the decoder in question. FIG. 13 gives a schematic outline about how the addressing/driving logic chip is connected to the chips and FIG. 14 schematically shows two options of how the individual units of 16 emitters can be assembled together.

Figure 15:
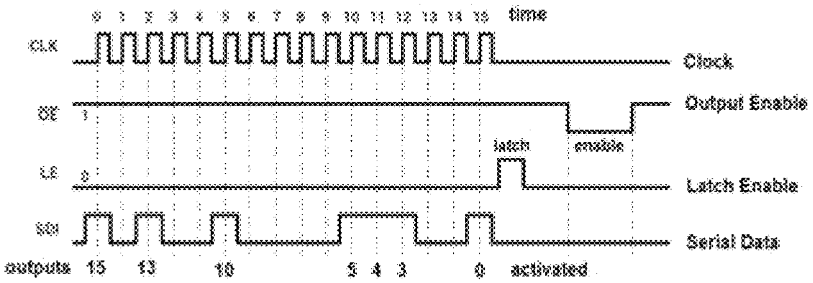
FIG. 15 schematically depicts one optional way of addressing the driving logic chips by a serial data stream.

The emitter drivers are addressed by a serial data stream. FIG. 15 shows the logic diagram for the reading of the serial data, wherein the data is clocked in (CLK) at a rate of 30 MHz, starting with the Most Significant Bit (Out15), and ending with the Least Significant Bit (Out0). After the data has been read in, the Latch Enable (LE) is clocked, which will store the last 16 bits in the chip. Upon setting the Output Enable (OE) low, the stored data is displayed, i.e. the corresponding emitters are switched on. In the shown example, emitters no 0, 3, 4, 5, 10, 13, 15 are switched on. The addressing of multiple decoder units is done via the Latch Enable line, which is clocked individually for each decoder when the serial data stream has reached the position corresponding to the data to be displayed by the decoder in question.

The actinic radiation LED source (x41) further comprises processing means, e.g. a rapid microprocessor, for feeding the bitmap pattern or other supplied data into the driver emitters (driver chips). Their serial connection is rapid, 30 MHz=33 nsec per clock cycle, such that a line of 256 pixels can be fed into the emitters (chips) in less than 10 microseconds. The maximum display speed is thus 100,000 lines per second, which corresponds, at a substrate speed of 3 m/sec, to a line density of 33 lines/mm. The processor is preferably also in charge of coordinating the output of the bitmap or other data with the speed of the device on which the actinic radiation LED source (x41) comprising the array of individually addressable actinic radiation emitters is operated.

As mentioned herein, the present invention provides processes to produce optical effect layers (OELs) on a substrate (x10) such as those described herein. The substrate (x10) described herein is preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc. When the OELs produced according to the present invention are used for decorative or cosmetic purposes including for example fingernail lacquers, said OEL may be produced on other type of substrates including nails, artificial nails or other parts of an animal or human being.

Should the OEL produced according to the present invention be on a security document, and with the aim of further increasing the security level and the resistance against counterfeiting and illegal reproduction of said security document, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

If desired, a primer layer may be applied to the substrate prior to the step a). This may enhance the quality of the optical effect layer (OEL) described herein or promote adhesion. Examples of such primer layers may be found in WO 2010/058026 A2

With the aim of increasing the durability through soiling or chemical resistance and cleanliness and thus the circulation lifetime of an article, a security document or a decorative element or object comprising the optical effect layer (OEL) obtained by the process described herein, or with the aim of modifying their aesthetical appearance (e.g. optical gloss), one or more protective layers may be applied on top of the optical effect layer (OEL). When present, the one or more protective layers are typically made of protective varnishes. These may be transparent or slightly colored or tinted and may be more or less glossy. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the optical effect layer (OEL).

The present invention further provides optical effect layers (OELs) produced by the process described herein.

The optical effect layer (OEL) described herein may be provided directly on a substrate on which it shall remain permanently (such as for banknote applications). Alternatively, an optical effect layer (OEL) may also be provided on a temporary substrate for production purposes, from which the OEL is subsequently removed. This may for example facilitate the production of the optical effect layer (OEL), particularly while the binder material is still in its fluid state. Thereafter, after hardening the coating composition for the production of the optical effect layer (OEL), the temporary substrate may be removed from the OEL.

Alternatively, in another embodiment an adhesive layer may be present on the optical effect layer (OEL) or may be present on the substrate comprising OEL, said adhesive layer being on the side of the substrate opposite to the side where the OEL is provided or on the same side as the OEL and on top of the OEL. Therefore an adhesive layer may be applied to the optical effect layer (OEL) or to the substrate, said adhesive layer being applied after the curing step has been completed. Such an article may be attached to all kinds of documents or other articles or items without printing or other processes involving machinery and rather high effort. Alternatively, the substrate described herein comprising the optical effect layer (OEL) described herein may be in the form of a transfer foil, which can be applied to a document or to an article in a separate transfer step. For this purpose, the substrate is provided with a release coating, on which the optical effect layer (OEL) are produced as described herein.

One or more adhesive layers may be applied over the so produced optical effect layer (OEL).

Also described herein are substrates comprising more than one, i.e. two, three, four, etc. optical effect layers (OELs) obtained by the process described herein.

Also described herein are articles, in particular security documents, decorative elements or objects, comprising the optical effect layer (OEL) produced according to the present invention. The articles, in particular security documents, decorative elements or objects, may comprise more than one (for example two, three, etc.) OELs produced according to the present invention.

As mentioned hereabove, the optical effect layers (OELs) produced according to the present invention may be used for decorative purposes as well as for protecting and authenticating a security document.

Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) may be produced onto an auxiliary substrate such as for example a security thread, security stripe, a foil, a decal, a window or a label and consequently transferred to a security document in a separate step.

The present invention further provides devices for producing the optical effect layers (OELs) on the substrate described herein, said devices comprising:

i) a printing unit, preferably a screen printing, rotogravure printing or flexography printing unit, for applying on the substrate (x10) the radiation curable coating composition comprising the non-spherical magnetic or magnetizable particles described herein so as to form the coating layer (x20) described herein, ii) at least a first magnetic-field-generating device (x31) such as those described herein and optionally a second magnetic-field-generating device (x32) such as those described herein for orienting at least a part of the non-spherical magnetic or magnetizable particles of the coating layer (x20), iii) the one or more actinic radiation LED sources (x41) comprising the array, preferably the linear array or the two dimensional array, of individually addressable actinic radiation emitters described herein, preferably UV light-emitting diodes, for the selective curing of the one or more areas of the coating layer (x20).

The devices for producing the optical effect layers (OELs) on the substrate described herein may further comprise one or more magnetic devices to carry out the bi-axial orientation described herein.

The device described herein may further comprise a conveying means such as those described herein for conveying the substrate (x10) carrying the coating layer (x20) in the vicinity of the actinic radiation LED sources (x41).

The device described herein may further comprise a transferring device such as those described herein, wherein the first magnetic-field-generating device (x31) and the optional second magnetic-field-generating device (x32) are mounted onto said transferring device described herein, said transferring device being preferably a rotating cylinder or a belt, wherein said transferring device allows the substrate (x10) carrying the coating layer (x20) to concomitantly move with the first magnetic-field-generating device (x31) and the optional second magnetic-field-generating device (x32) and in the vicinity of the actinic radiation LED sources (x41).

In an embodiment wherein the first magnetic-field-generating device (x31) and the optional second magnetic-field-generating device (x32) are mounted onto a rotating cylinder or a belt, the resulting magnetic rotating magnetic cylinder or the resulting magnetic belt is preferably part of a rotary, sheet-fed or web-fed industrial printing press that operates at high printing speed in a continuous way. Preferably, the device described herein comprises the one or more actinic radiation LED sources (x41) further comprising the projection means (x50) described herein, and wherein said least one or more actinic radiation LED sources (x41) and said projection means (x50) are arranged such that the actinic radiation is projected onto the coating layer (x20) under size reduction of the one or more projected images of the one or more actinic radiation LED sources (x41) such as described herein.

The invention claimed is:

1. A device for producing an optical effect layer (OEL) on a substrate, said OEL comprising a motif made of at least two areas made of a single applied and cured layer and said device comprising:

i) a printing unit for applying on the substrate a radiation curable coating composition comprising non-spherical magnetic or magnetizable particles so as to form a coating layer, ii) at least a first magnetic-field-generating device and optionally a second magnetic-field-generating device for orienting at least a part of the non-spherical magnetic or magnetizable particles of the coating layer, and iii) one or more actinic radiation LED sources comprising an array of individually addressable actinic radiation emitters for the selective curing of one or more areas of the coating layer, and iv) a conveying means for conveying the substrate carrying the coating layer in the vicinity of the actinic radiation LED sources, wherein the one or more actinic radiation LED sources comprise a projection means to project actinic radiation from the one or more actinic radiation LED sources onto the coating layer, and wherein said one or more actinic radiation LED sources and said projection means are arranged such that the actinic radiation is projected onto the coating layer under size reduction of the one or more projected images of the one or more actinic radiation LED sources, and wherein the actinic radiation emitters are configured to project the one or more images and selectively cure the one or more areas of the coating layer, by individually switching on and off in a time-dependent manner while the substrate carrying the coating layer is in motion.

2. The device according to claim 1, wherein the array of individually addressable actinic radiation emitters is a linear array or a two dimensional array of individually addressable actinic radiation emitters.

3. The device according to claim 1, wherein the device further comprises:

v) one or more magnetic devices to carry out bi-axial orientation.

4. The device according to claim 1, wherein the device further comprises:

vi) a transferring device for concomitantly moving the substrate carrying the coating layer with the first magnetic-field-generating device and the optional second magnetic-field-generating device.

5. The device according to claim 1, wherein the array of individually addressable actinic radiation emitters is a two dimensional array of individually addressable actinic radiation emitters, and wherein the individually addressable actinic radiation emitters are configured to be switched on and off in such a way that the projected image synchronously follows the moving substrate.

* * * * *